US011020915B2

(12) United States Patent
Zhou et al.

(10) Patent No.: US 11,020,915 B2
(45) Date of Patent: Jun. 1, 2021

(54) EXTENDED SEALING GELS, PROCESS FOR PRODUCTION THEROF AND USE THEROF IN SEALING COMPOUNDS FOR SELF-SEALING TYRES

(71) Applicant: ARLANXEO DEUTSCHLAND GMBH, Dormagen (DE)

(72) Inventors: Jiawen Zhou, Düsseldorf (DE); Thomas Früh, Wuppertal (DE); Torsten Thust, Wermelskirchen (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 16/477,768

(22) PCT Filed: Jan. 25, 2018

(86) PCT No.: PCT/EP2018/051773
§ 371 (c)(1),
(2) Date: Jul. 12, 2019

(87) PCT Pub. No.: WO2018/138182
PCT Pub. Date: Aug. 2, 2018

(65) Prior Publication Data
US 2019/0366657 A1 Dec. 5, 2019

(30) Foreign Application Priority Data
Jan. 26, 2017 (EP) .................................... 17153283

(51) Int. Cl.
| | | |
|---|---|---|
| *B29C 73/16* | (2006.01) | |
| *C08J 3/075* | (2006.01) | |
| *C09J 109/00* | (2006.01) | |
| *C09J 109/06* | (2006.01) | |
| *B29L 30/00* | (2006.01) | |

(52) U.S. Cl.
CPC ............ *B29C 73/163* (2013.01); *C08J 3/075* (2013.01); *C09J 109/00* (2013.01); *C09J 109/06* (2013.01); *B29L 2030/00* (2013.01); *C08J 2309/00* (2013.01); *C08J 2309/06* (2013.01); *C08J 2409/00* (2013.01); *C08J 2409/06* (2013.01)

(58) Field of Classification Search
CPC ..... B29C 73/163; C08J 3/075; C08J 2309/00; C08J 2309/06; C08J 2409/00; C08J 2409/06; C09J 109/00; C09J 109/06; B29L 2030/00
USPC ......................................................... 524/62
See application file for complete search history.

(56) References Cited

U.S. PATENT DOCUMENTS

| | | | |
|---|---|---|---|
| 10,815,364 B2 * | 10/2020 | Kohl ...................... C08F 236/10 | |
| 2003/0139523 A1 * | 7/2003 | Nakamura ................ C08L 9/08 | 524/571 |
| 2007/0167555 A1 | 7/2007 | Amino et al. | |
| 2012/0041129 A1 | 2/2012 | Steinhauser et al. | |

FOREIGN PATENT DOCUMENTS

| | | |
|---|---|---|
| EP | 2296918 B1 | 1/2013 |
| EP | 3124508 A1 | 2/2017 |

OTHER PUBLICATIONS

Rodgers et al., "Rubber Compounding—Section 8.2.3: Softeners, Extenders, and Plasticizers" Enc. Polym. Sci. Tech., vol. 11, pp. 664. (Year: 2004).*
Gangolli, S., Ed., "polybutenes," The Dictionary of Substances and Their Effects (DOSE), 3d Electronic Ed., Royal Society of Chemistry. Retrieved from Knovel [retrieved Nov. 16, 2020] (Year: 2005).*
Sommer, "2.13 Process Aids,"Troubleshooting Rubber Problems, Hanser Publications, pp. 29-30. (Year: 2013).*
Extended European Search Report for corresponding application EP 17153283.1 dated Jun. 23, 2017.
International Search Report for corresponding application PCT/EP2018/051773 dated May 22, 2018.
Written Opinion of the International Searching Authority for corresponding application PCT/EP2018/051773 dated May 22, 2018.

* cited by examiner

*Primary Examiner* — Josephine L Chang
(74) *Attorney, Agent, or Firm* — Norris McLaughlin PA

(57) ABSTRACT

A sealing compound comprising an inventive extended sealing gel, a process for producing this sealing compound, the use of sealing gels in sealing compounds, and the use of sealing gel-containing sealing compounds in tyres

21 Claims, No Drawings

EXTENDED SEALING GELS, PROCESS FOR PRODUCTION THEROF AND USE THEROF IN SEALING COMPOUNDS FOR SELF-SEALING TYRES

This is an application filed under 35 USC 371 based on PCT/EP2018/051773 filed 25 Jan. 2018, which in turn is based on EP 177153283.1 filed 26 Jan. 2017. The present application claims the full priority benefit of these prior applications and herein incorporates by reference the full disclosures of these prior applications.

The present invention relates to a sealing compound comprising an inventive sealing gel, a process for producing this sealing compound, the use of sealing gels in sealing compounds, and the use of sealing gel-containing sealing compounds in tyres.

In the operation of a pneumatic tyre for cars and trucks, there is the risk of damage to the tyre as a result of the penetration of foreign bodies and of the tyre losing air because of the damage. The loss of tyre air often leads to an unstable ride state which requires the immediate changing of or a makeshift repair to the tyre. In order not to have to stop and leave the vehicle for a tyre change or repair in hazardous traffic situations, various tyre and wheel designs have been developed. Thus, there exist on the market tyres having runflat properties which enable temporary continuation of the journey by lowering the tread onto a support ring beneath in the event of loss of tyre pressure. In addition, there are runflat tyres which feature a reinforced tyre sidewall which, in the event of loss of tyre pressure, can bear the axle load even without air pressure for a limited period, without getting into an unsafe ride situation. All these designs that are present on the market increase the weight of the tyre and the rolling resistance significantly, and hence the consumption of fuel in motor vehicle operation.

Tyres having a sealing compound in the form of a self-sealing layer which surrounds penetrating foreign bodies and/or directly closes the holes that they form are known in principle.

As early as 1968, U.S. Pat. No. 3,565,151 disclosed a self-sealing tyre containing two plies of sealing compounds which are separated by the inner liner and are supported from bead to bead within the tyre carcass. The sealing material consists mainly of styrene-butadiene rubber (SBR) and a small amount of crosslinkers, wherein the SBR component is a mixture of 80 phr to 95 phr (parts per hundred rubber) of cold-polymerized SBR and 5 phr to 20 phr of hot-polymerized SBR. The document does not give any pointer at all to adhesion and cohesion properties.

Self-sealing tyres are also disclosed in U.S. Pat. No. 3,981,342. The patent describes a self-sealing tyre having a layer including a mixture of a low molecular weight liquid elastomer and a high molecular weight solid elastomer, and an amount of crosslinking agent sufficient to produce partial crosslinking of the mixture, the liquid elastomer being present in a greater amount than the solid elastomer.

U.S. Pat. No. 4,228,839 discloses a self-sealing tyre having a layer including a mixture of a polymeric material degradable by high-energy radiation and a polymeric material crosslinkable by radiation and/or by heat.

U.S. Pat. No. 4,664,168 discloses a self-sealing tyre having a self-sealing layer on the inside and a multitude of support elements which partly overlap with the sealing layer, in order to keep the sealing compound in place during production and use.

U.S. Pat. No. 7,004,217 discloses a self-sealing tyre comprising a sealing chamber having a sealing compound between the carcass and the inner liner.

U.S. Pat. No. 4,113,799 discloses a sealing layer comprising a butyl rubber of high molecular weight and a butyl rubber of low molecular weight in a ratio of 20:80 to 60:40, with addition of tackifiers in an amount of 55% by weight to 70% by weight.

DE-A-10-2009-003333 discloses sealing compounds composed of viscoelastic gel for self-sealing pneumatic motor vehicle tyres, comprising a filler composed of polymers such as unvulcanized or vulcanized rubber in the form of particles having a mean diameter of 0.05 mm to 8 mm. The particles are intended to further improve the sealing action compared to known sealants composed of gel. The effects on the adhesion and cohesion properties are undisclosed.

WO-A-2008/019901 discloses, inter alia, sealing compounds based on partially crosslinked butyl rubber. In principle, useful sealants are those which are based on rubbers and on a combination of liquid rubber types of low molecular weight and solid rubber types of high molecular weight, as described, for example, in U.S. Pat. No. 5,295,525.

The gel systems detailed in U.S. Pat. No. 6,508,898 are based on polyurethane and silicone. However, vulcanizates made from silicone rubber lack resistance to naphthenic and aromatic oils, for example. Low adhesion to other substrates (low surface energy) and high water vapour and gas permeability are likewise disadvantageous for use for tyres. It has been stated that silicone rubber has a gas permeability 100 times higher than BR or natural rubber (Kautschuk Technologie [Rubber Technology], F. Rothemeyer, F. Sommer, Carl Hanser Verlag Munich Vienna, 2006; page 206). A disadvantage of the use of polyurethane rubbers is their lack of compatibility with plasticizers. Phthalic and adipic esters are compatible at up to 30 phr. Polyester types require hydrolysis stabilizers; polyether types require UV stabilizers. Polyurethane elastomers that are to be found in the upper region of the hardness scale also have unfavourable heat resistance because of their propensity to hydrolysis (Kautschuk Technologie, F. Rothemeyer, F. Sommer, Carl Hanser Verlag Munich Vienna, 2006; page 218). For the reasons mentioned above, therefore, use of sealants for silicone rubber- and polyurethane rubber-based tyre applications is disadvantageous.

WO-A-2009/143895 discloses sealing compounds comprising precrosslinked SBR particles as a secondary component and natural or synthetic rubber as a main component. These crosslinked SBR particles are produced by hot emulsion polymerization. Various studies show that the reduction in the polymerization temperature from 50° C. in the case of hot emulsion polymerization to 5° C. in the case of cold emulsion polymerization had a strong influence on the molecular weight distribution. The formation of low molecular weight fractions in the rapid reaction of the thiols in the initial phase of the free-radical polymerization at 5° C. was distinctly reduced, and so better control of the chain length of the polymers was enabled. It was shown that, as well as the improved chain length distribution, the unwanted and uncontrolled crosslinking reaction was also distinctly reduced. The SBR particles obtained by hot emulsion polymerization therefore have, compared to cold polymers, a very broad molecular weight distribution and a high level of uncontrolled branching. Controlled adjustment of the viscoelastic properties is therefore impossible (Science and Technology of Rubber, James E. Mark, Burak Erman, Elsevier Academic Press, 2005, page 50).

Viscoelasticity is a characteristic of the material in the sense that, as well as features of pure elasticity, features of viscous fluidity are also present, which is manifested, for example, in the occurrence of internal friction on deformation.

The resulting hysteresis is typically characterized by the measurement of the loss factor tan δ at high temperature (e.g. 60° C.) and is a key parameter for rubber mixtures in tyres, especially for tyre treads. The hysteresis is not just an indicator of the heat build up in rubber mixtures under dynamic stress (reversible elongation) but also a good indicator of the rolling resistance of a tyre (Rubber Technologist's Handbook, Volume 2; page 190). A measurement parameter for hysteresis losses is the tan δ, which is defined as the ratio of loss modulus to storage modulus; cf., for example, also DIN 53 513, DIN 53 535.

The lowering of tan δ in the temperature/frequency range and amplitude range of application-related relevance leads, for example, to reduced heat buildup in the elastomer. Minimum rolling resistance of the tyres enables minimum fuel consumption of the vehicle equipped therewith.

Rolling resistance is understood to mean the conversion of mechanical energy to heat by the rotating tyre per unit length. The dimension of rolling resistance is joules per metre (Scale Models in Engineering, D. Schuring, Pergamon Press, Oxford, 1977).

It is known that what are called rubber gels can be used in blends with a wide variety of different rubbers in tyre treads, in order, for example, to improve the rolling resistance of car tyres (see, for example, DE-A-4220563, GB-A-1078400, EP-A-405216 and EP-A-0854171).

DE 60118364 T2, EP-A-1149866 and EP-A-1291369 describe the production of SBR microgels with the aid of cold emulsion polymerization for tyre applications.

DE-A-10345043 and DE-A-10-2005-014271 disclose that what are called microgels are also used in uncrosslinked mixtures containing a thermoplastic material or a functional additive.

US 2002/0045697 A1 discloses the addition of softeners to rubber compositions in order to lower their viscosity and to improve their processability. For this purpose, preferably commercial products in the form aromatic process oils can be used. Such aromatic oils lower viscosity and/or hardness. However, the use of softeners with sealing materials is not disclosed. Such uses are problematic in that softeners general adversely impact the cohesive properties of the resulting material which in turn negatively affects the resulting sealing properties and the dimensional stability within the tyre.

If not otherwise stated herein, it is to be assumed that all patents, patent applications, patent publications and other publications mentioned and cited herein are hereby fully incorporated by reference herein as if set forth in their entirety herein.

None of these documents teaches the production of sealing gels having incorporated therein one or more extender compounds as discussed further herein.

Sealing compounds generally have to meet high demands in practical use. They have to be soft, tacky and dimensionally stable over the entire range of operating temperatures from −40° C. to +90° C. At the same time, sealing compounds also have to be viscous. Following entry of an object through the tyre tread into the interior of the tyre, the sealing compound should enclose the object. If the object exits from the tyre, the sealing compound sticking to the object is drawn into the resulting hole or the sealing compound flows into the hole as a result of the internal tyre pressure and closes the hole. In addition, these sealing compounds have to be impervious to gas, such that temporary further travel is enabled. Sealing compounds should be applicable to the tyre inner liner in a simple process.

Sealing compounds should additionally have to have high adhesion to the inner liner, and high cohesion in order to remain dimensionally stable within the tyre.

The prior art shows that the known sealing compounds are still not satisfactory for particular applications in which not only a minimum rolling resistance but also where simultaneously excellent adhesion and cohesion properties as well as good processability are necessary.

A problem addressed by the present invention was therefore that of providing sealing gels for use in sealing compounds in self-sealing tyres, which fulfil the high demands in practical use, especially in terms of adhesion and cohesion properties, as well as providing good processability, and which may have viscoelastic properties improved over the prior art.

Accordingly, a further problem addressed by the present invention was that of providing sealing compounds having excellent adhesion and cohesion and having minimum deterioration of rolling resistance.

It has been found that, surprisingly, sealing gels extended with an extender compound are particularly advantageous for the production of self-sealing compounds for self-sealing tyres and for their sealing properties.

In an embodiment of the present invention there is a sealing gel
  i) in the form of a mixture comprising a diene rubber gel (A) obtainable by emulsion polymerization of at least one conjugated diene in the presence of at least one crosslinker (I) and a second diene rubber gel (B) obtainable by emulsion polymerization of at least one conjugated diene in the presence of at least one crosslinker (II), or
  ii) obtainable by emulsion polymerization of at least one conjugated diene in the presence of at least one crosslinker (I) and/or in the presence of at least one crosslinker (II), referred to hereinafter as gel (H1)
  where
  crosslinkers (I) are acrylates and methacrylates of polyhydric, preferably di- to tetrahydric, $C_2$-$C_{20}$ alcohols, preferably selected from the group consisting of acrylates and methacrylates of ethylene glycol, propane-1,2-diol, butane-1,4-diol, hexanediol, polyethylene glycol having 2 to 8 and preferably 2 to 4 oxyethylene units, neopentyl glycol, bisphenol A, glycerol, trimethylolpropane, pentaerythritol, sorbitol with unsaturated polyesters of aliphatic di- and polyols and mixtures thereof, more preferably selected from the group consisting of acrylates and methacrylates of propane-1,2-diol, butane-1,4-diol, neopentyl glycol, bisphenol A, glycerol, trimethylolpropane and pentaerythritol, and crosslinker (I) is most preferably trimethylolpropane trimethacrylate (TMPTMA),
  and
  crosslinkers (II) are compounds having two or more vinyl, allyl or isopropenyl groups or one maleimide unit, preferably selected from the group consisting of diisopropenylbenzene, divinylbenzene (DVB), divinyl ether, divinyl sulphone, diallyl phthalate, trivinylbenzene, triallyl cyanurate, triallyl isocyanurate, 1,2-polybutadiene, N,N'-m-phenylenemaleimide, tolylene-2,4-bis(maleimide) and triallyl trimellitate and mixtures thereof, more preferably selected from the group of diisopropenylbenzene, divinylbenzene and trivinylbenzene, and crosslinker (II) is most preferably divinylbenzene, wherein the sealing gel further comprises an extender compound incorporated therein, and wherein said extender compound is a liquid elastomer and/or a lubricant oil.

In another embodiment of the invention there is a sealing gel
i) in the form of a mixture comprising a diene rubber gel (A) obtainable by emulsion polymerization of at least one conjugated diene in the presence of at least one crosslinker (I) and a second diene rubber gel (B) obtainable by emulsion polymerization of at least one conjugated diene in the presence of at least one crosslinker (II), or
ii) obtainable by emulsion polymerization of at least one conjugated diene in the presence of at least one crosslinker (I) and in the presence of at least one crosslinker (II), referred to hereinafter as gel (H2)

where
crosslinkers (I) are acrylates and methacrylates of polyhydric, preferably di- to tetrahydric, $C_2$-$C_{20}$ alcohols, preferably selected from the group consisting of acrylates and methacrylates of ethylene glycol, propane-1,2-diol, butane-1,4-diol, hexanediol, polyethylene glycol having 2 to 8 and preferably 2 to 4 oxyethylene units, neopentyl glycol, bisphenol A, glycerol, trimethylolpropane, pentaerythritol, sorbitol with unsaturated polyesters of aliphatic di- and polyols and mixtures thereof, more preferably selected from the group consisting of acrylates and methacrylates of propane-1,2-diol, butane-1,4-diol, neopentyl glycol, bisphenol A, glycerol, trimethylolpropane and pentaerythritol, and crosslinker (I) is most preferably trimethylolpropane trimethacrylate (TMPTMA), and crosslinkers (II) are compounds having two or more vinyl, allyl or isopropenyl groups or one maleimide unit, preferably selected from the group consisting of diisopropenylbenzene, divinylbenzene (DVB), divinyl ether, divinyl sulphone, diallyl phthalate, trivinylbenzene, triallyl cyanurate, triallyl isocyanurate, 1,2-polybutadiene, N,N'-m-phenylenemaleimide, tolylene-2,4-bis(maleimide) and triallyl trimellitate and mixtures thereof, more preferably selected from the group of diisopropenylbenzene, divinylbenzene and trivinylbenzene, and crosslinker (II) is most preferably divinylbenzene, wherein the sealing gel further comprises an extender compound incorporated therein, and wherein said extender compound is a factice.

In one embodiment extended sealing gels are also mixtures of at least one gel (H1/H2) with diene rubber gel (A) or (B) or (A) and (B), wherein at least one of the gel (H1/H2), diene rubber gel (A) or (B) has incorporated therein at least one extender compound.

In an embodiment where styrene-butadiene copolymer (SBR) is the diene rubber gel (A) or diene rubber gel (B) or gel (H1/H2), such a diene rubber gel (A) or diene rubber gel (B) or gel (H1/H2) is obtainable by cold emulsion polymerization at 5° C. to 20° C.

The term diene rubber gel in the context of this invention is a diene rubber which has been reacted with at least one crosslinker (I) or with at least one crosslinker (II) during the polymerization.

Extended sealing gels and extended diene rubber gels shall be understood as meaning a sealing gel or diene rubber gel having an extender compound incorporated therein. Incorporated therein shall be understood to mean that the extender compound is mixed with the sealing gel or diene rubber gel before precipitation of the diene rubber gel or sealing gels such that the extender compound remains within the diene rubber gel or sealing gel network. (See for example, Kautschuk Technologie, F. Rothemeyer, F. Sommer, Carl Hanser Verlag Munich Vienna, 2006; page 99) In the case where the extender compound is factice, then it is mixed with diene rubber gel or sealing gel on an open mill or extruder or internal mixer and/or other methods commonly known to those skilled in the art.

Sealing compounds in the context of the invention are compositions comprising extended sealing gels (i.e., sealing gels having an extender compound incorporated therein) and one or more further additives.

In one embodiment there is a sealing compound comprising at least one sealing gel in accord with those described herein of 45 phr to 100 phr, preferably 60 phr to 100 phr and more preferably 70 phr to 100 phr, resin (C) in an amount of 10 phr to 60 phr, preferably 20 phr to 50 phr and more preferably 25 phr to 45 phr, and a natural rubber or synthetic rubber (E), preferably copolymers based on conjugated diolefins from a group comprising 1,3-butadiene, isoprene, 2,3-dimethyl-1,3-butadiene, 1,3-pentadiene, 1,3-hexadiene, 3-butyl-1,3-octadiene, 2-phenyl-1,3-butadiene or mixtures thereof, more preferably from a group comprising natural cis-1,4-polyisoprene, synthetic cis-1,4-polyisoprene, 3,4-polyisoprene, polybutadiene, 1,3-butadiene-acrylonitrile copolymer and mixtures thereof, in an amount of less than 55 phr, preferably 1 phr to 40 phr and more preferably 5 phr to 30 phr, based in each case on the total amount of sealing gel and natural and/or synthetic rubber (E) in the sealing compound.

In combination with resins (C) and optionally ageing stabilizers (D), further natural and/or synthetic rubber (E) and optionally plasticizers (F), sealing compounds with tailored adhesion to the inner liner and cohesion, and also low rolling resistance are produced.

It should be noted at this point that the scope of the invention includes any and all possible combinations of the components, ranges of values and/or process parameters mentioned above and cited hereinafter, in general terms or within areas of preference.

In one embodiment, the extended sealing gels of the invention are produced by i-a) emulsion polymerization of monomers to give diene rubber gel, wherein diene rubber gel (A) is produced by the emulsion polymerization with at least one crosslinker (I) and diene rubber gel (B) is produced by the emulsion polymerization with at least one crosslinker (II), followed by mixing of the diene rubber gels (A) and (B) to give the sealing gel or i-b) emulsion polymerization of monomers with at least one crosslinker (I) and simultaneously with at least one crosslinker (II) or i-c) emulsion polymerization of monomers with at least one crosslinker (I) or at least one crosslinker (II), or ii) mixing a sealing gel produced according to process i-b) and/or i-c) with at least one diene rubber gel (A) or (B) or (A) and (B);

and iii) mixing an extender compound with at least one of i-a), i-b), i-c) and/or ii), whereby the extender compound is incorporated into the at least one i-a), i-b), i-c) and/or ii).

In one embodiment, the extender compound is a factice and the extended sealing gels of the invention are produced by:

ii-a) emulsion polymerization of monomers to give diene rubber gel, wherein diene rubber gel (A) is produced by the emulsion polymerization with at least one crosslinker (I) and diene rubber gel (B) is produced by the emulsion polymerization with at least one crosslinker (II), followed by mixing of the diene rubber gels (A) and (B) to give the sealing gel or ii-b) emulsion polymerization of monomers with at least one crosslinker (I) and simultaneously with at least one crosslinker (II) or iv) mixing a sealing gel produced according to process ii-b) with at least one diene rubber gel (A) or (B) or (A) and (B); and v) mixing an extender compound with at least one of ii-a), ii-b) and/or iv) whereby the extender compound is incorporated into the at least one of ii-a), ii-b), and/or iv).

Extended sealing gels of the invention have a Mooney viscosity (ML1+4) @100° C. of less than 100 MU, preferably 30 to 90 MU, particularly preferred 40 to 85 MU and can be established in a controlled manner by mixing of the diene rubber gels (A) and (B) in an A:B ratio=(1:9) to (9:1), preferably in an A:B ratio=(4:1) to (1:4), more preferably in an A:B ratio=(2.5:1) to (1:2.5) during the process for production thereof.

In addition, extended sealing gels of the invention having a Mooney viscosity (ML-1+4) 100° C. of less than 100 MU, preferably 30 to 90 MU, particularly preferred 40 to 85 MU can be produced in a controlled manner by mixing the diene rubber gels (A) and/or (B) with gel (H1/H2).

The crosslinking with crosslinker (I) or with crosslinker (II) can be conducted as follows:

a) The at least one crosslinker (I) or the at least one crosslinker (II) or at least one crosslinker (I) and one crosslinker (II) are initially charged.

b) The at least one crosslinker (I) or the at least one crosslinker (II) or at least one crosslinker (I) and one crosslinker (II) are metered in during the polymerization.

In the production of the diene rubber gels (A) and (B) and in the case of the gel (H1/H2) by emulsion polymerization, at least one conjugated diene is used as free-radically polymerizable monomer.

Examples of conjugated dienes are 1,3-butadiene, 2,3-dimethyl-1,3-butadiene, isoprene and chloroprene, preferably 1,3-butadiene.

The amount of diene monomer is typically 79.8 phm to 98.8 phm, preferably 86 phm to 91.8 phm (parts per hundred parts monomer).

In the production of the diene rubber gels (A) and (B) and in the case of the gel (H1/H2) by emulsion polymerization, it is also possible to use further monomers other than the diene used.

In the production of the diene rubber gels and sealing gels by emulsion polymerization, for example, the following free-radically polymerizable monomers are used as further monomers other than the diene monomer: 1,3-butadiene, vinylaromatics, preferably styrene, 2-methylstyrene, 3-methylstyrene, 4-methylstyrene, a-methylstyrene, 2,4-dimethylstyrene, 2,4-diisopropylstyrene, 4-tert-butylstyrene and tert-butoxystyrene, more preferably styrene, acrylonitrile, isoprene, esters of acrylic acid and methacrylic acid, tetrafluoroethylene, vinylidene fluoride, hexafluoropropene, 2-chlorobutadiene, 2,3-dichlorobutadiene, carboxylic acids containing double bonds, preferably acrylic acid, methacrylic acid, maleic acid or itaconic acid, hydroxyl compounds containing double bonds, preferably hydroxyethyl methacrylate, hydroxyethyl acrylate or hydroxybutyl methacrylate, amine-functionalized (meth)acrylates, glycidyl methacrylate, acrolein, N-vinyl-2-pyrrolidone, N-allylurea, N-allylthiourea, secondary amino (meth)acrylates, preferably 2-tert-butylaminoethyl methacrylate and 2-tert-butylaminoethylmethacrylamide, or vinylic heteroaromatics such as 2-, 4-vinylpyridine and 1-vinylimidazole.

The amount of further monomers is typically 1 phm to 20 phm, preferably 8 phm to 14 phm, based on the total amount of monomers.

In the case of a vinylaromatic as further monomer, the amount of vinylaromatic is typically 1 phm to 20 phm, preferably 8 phm to 14 phm, based on the total amount of monomers.

In an embodiment where styrene-butadiene copolymer (SBR) is the diene rubber gel (A) or diene rubber gel (B) or gel (H1/H2), such an SBR of the invention is one obtainable by cold emulsion polymerization at 5° C. to 20° C. Cold emulsion polymerization is a polymerization method familiar to those skilled in the art (see, inter alia, U.S. Pat. No. 3,565,151 (column 2 line 26), EP-A-1291369 [0055], EP-A-1149866 ([0077], [0080])) Kautschuk Technologie, F. Rothemeyer, F. Sommer, Carl Hanser Verlag Munich Vienna, 2006; page 95 ff.). Cold emulsion polymerization is conducted at a temperature of 5° C. to 20° C., preferably 5° C. to 15° C. and more preferably of 5° C. to 10° C. Compared to cold emulsion polymerization, hot emulsion polymerization is conducted at a temperature of more than 20° C. up to 150° C., preferably 40° C. to 80° C. The crosslinkers (I) and crosslinkers (II) differ by different incorporation characteristics during the emulsion polymerization.

In a preferred embodiment both crosslinkers (I) and (II) are present and crosslinkers (I) feature incorporation at an early stage in the polymerization.

Crosslinkers (I) are acrylates and methacrylates of polyhydric, preferably di- to tetrahydric, $C_2$-$C_{20}$ alcohols.

Preferred crosslinkers (I) are selected from the group consisting of acrylates and methacrylates of ethylene glycol, propane-1,2-diol, butane-1,4-diol, hexanediol, polyethylene glycol having 2 to 8 and preferably 2 to 4 oxyethylene units, neopentyl glycol, bisphenol A, glycerol, trimethylolpropane, pentaerythritol, sorbitol with unsaturated polyesters of aliphatic di- and polyols and mixtures thereof.

Particularly preferred crosslinkers (I) are acrylates and methacrylates of propane-1,2-diol, butane-1,4-diol, neopentyl glycol, bisphenol A, glycerol, trimethylolpropane and pentaerythritol.

A very particularly preferred crosslinker (I) is trimethylolpropane trimethacrylate (TMPTMA).

Crosslinkers (II) are compounds having two or more vinyl, allyl or isopropenyl groups or one maleimide unit.

Preferred crosslinkers (II) are selected from the group consisting of diisopropenylbenzene, divinylbenzene (DVB), divinyl ether, divinyl sulphone, diallyl phthalate, trivinylbenzene, triallyl cyanurate, triallyl isocyanurate, 1,2-polybutadiene, N,N'-m-phenylenemaleimide, tolylene-2,4-bis (maleimide) and triallyl trimellitate and mixtures thereof.

Particularly preferred crosslinkers (II) are diisopropenylbenzene, divinylbenzene, trivinylbenzene.

A very particularly preferred crosslinker (II) is divinylbenzene.

The amount of crosslinker used for the production of diene rubber gel (A) and (B) and for the production of gel (H1/H2), in the case of crosslinker (I), is typically 1 phm to 6 phm, preferably 1 phm to 4 phm, and more preferably 1.5 phm to 3 phm and, in the case of crosslinker (II), 0.2 phm to 4 phm, preferably 0.2 phm to 3 phm, and more preferably 0.5 phm to 2.7 phm, based on the total amount of diene monomer, further monomer and crosslinker in the diene rubber gel (A) or (B) or the gel (H1/H2), where the total amount of diene monomer, further monomer and crosslinker corresponds to 100 phm.

For the production of gel (H1/H2), having both crosslinker (I) and crosslinker (II), crosslinker (I) and crosslinker (II) are preferably used in a ratio of 5:1 to 1:5 and more preferably in a ratio of 5:1 to 1:1.

Emulsion polymerizations are generally conducted with use of emulsifiers. For this purpose, a wide range of emulsifiers are known and available to those skilled in the art. Emulsifiers used may, for example, be anionic emulsifiers or else uncharged emulsifiers. Preference is given to using anionic emulsifiers, more preferably anionic emulsifiers in the form of water-soluble salts.

Anionic emulsifiers used may be modified resin acids which are obtained by dimerization, disproportionation, hydrogenation and modification of resin acid mixtures comprising abietic acid, neoabietic acid, palustric acid, levopimaric acid. A particularly preferred modified resin acid is disproportionated resin acid (Ullmann's Encyclopedia of Industrial Chemistry, 2011, 6th edition, volume 31, p. 345-355).

Anionic emulsifiers used may also be fatty acids. These contain 6 to 22 carbon atoms per molecule. They may be fully saturated or contain one or more double bonds in the molecule. Examples of fatty acids are caproic acid, lauric acid, myristic acid, palmitic acid, stearic acid, oleic acid, linoleic acid, linolenic acid. The carboxylic acids are typically based on origin-specific oils or fats, for example *ricinus* oil, cottonseed, peanut oil, linseed oil, coconut fat, palm kernel oil, olive oil, rapeseed oil, soya oil, fish oil and bovine tallow etc. Preferred carboxylic acids derive from coconut fatty acid and from bovine tallow, and are partly or fully hydrogenated.

Such carboxylic acids based on modified resin acids or fatty acids are used in the form of water-soluble lithium, sodium, potassium and ammonium salts. The sodium salts and potassium salts are preferred.

Anionic emulsifiers are additionally sulphonates, sulphates and phosphates bonded to an organic radical. Useful organic radicals include aliphatic, aromatic, alkylated aromatic systems, fused aromatic systems, and methylene-bridged aromatic systems, where the methylene-bridged and fused aromatic systems may additionally be alkylated. The length of the alkyl chains is 6 to 25 carbon atoms. The length of the alkyl chains bonded to the aromatic systems is between 3 and 12 carbon atoms.

The sulphates, sulphonates and phosphates are used in the form of lithium salts, sodium salts, potassium salts and ammonium salts. The sodium salts, potassium salts and ammonium salts are preferred.

Examples of sulphonates, sulphates and phosphates of this kind are sodium laurylsulphate, sodium alkylsulphonate, sodium alkylarylsulphonate, sodium salts of methylene-bridged arylsulphonates, sodium salts of alkylated naphthalenesulphonates, and the sodium salts of methylene-bridged naphthalenesulphonates, which may also be oligomerized, where the oligomerization level is between 2 and 10. Typically, the alkylated naphthalenesulphonic acids and the methylene-bridged (and optionally alkylated) naphthalenesulphonic acids are in the form of isomer mixtures which may also contain more than one sulphonic acid group (2 to 3 sulphonic acid groups) in the molecule. Particular preference is given to sodium laurylsulphate, sodium alkylsulphonate mixtures having 12 to 18 carbon atoms, sodium alkylarylsulphonates, sodium diisobutylenenaphthalenesulphonate, methylene-bridged polynaphthalenesulphonate mixtures and methylene-bridged arylsulphonate mixtures.

Uncharged emulsifiers derive from addition products of ethylene oxide and propylene oxide onto compounds having sufficiently acidic hydrogen. These include, for example, phenol, alkylated phenol and alkylated amines. The mean polymerization levels of the epoxides are between 2 and 20. Examples of uncharged emulsifiers are ethoxylated nonylphenols having 8, 10 and 12 ethylene oxide units. The uncharged emulsifiers are typically not used alone, but in combination with anionic emulsifiers.

Preference is given to the sodium and potassium salts of disproportionated abietic acid and partly hydrogenated tallow fatty acid, and mixtures thereof, sodium laurylsulphate, sodium alkylsulphonates, sodium alkylbenzenesulphonate, and alkylated and methylene-bridged naphthalenesulphonic acids.

The emulsifiers are used in an amount of 0.2 phm to 15 phm, preferably 0.5 phm to 12.5 phm, more preferably 1.0 phm to 10 phm, based on the total amount of diene monomer, further monomer and crosslinker.

The emulsion polymerization is generally conducted using the emulsifiers mentioned. If, on completion of the polymerization, latices having a tendency to premature self-coagulation because of a certain instability are obtained, said emulsifiers can also be added for post-stabilization of the latices. This may become necessary particularly prior to the removal of unconverted monomers by treatment with steam and before any storage of latex.

The emulsion polymerization is conducted in such a way that the rubber in accordance with the invention, for example in a preferred embodiment SBR, is crosslinked during the polymerization. Therefore, the use of molecular weight regulators is generally not obligatory. To control the crosslinking, however, it is advantageous to use molecular weight regulators, but the nature thereof is uncritical. In that case, the regulator is typically used in an amount of 0.01 phm to 3.5 phm, preferably 0.05 phm to 2.5 phm, per 100 phm, based on the total amount of diene monomer, further monomer and crosslinker. Molecular weight regulators used may, for example, be mercaptan-containing carboxylic acids, mercaptan-containing alcohols, xanthogen disulphides, thiuram disulphides, halogenated hydrocarbons, branched aromatic or aliphatic hydrocarbons, or else linear or branched mercaptans. These compounds typically have 1 to 20 carbon atoms.

Examples of mercaptan-containing alcohols and mercaptan-containing carboxylic acids are monothioethylene glycol and mercaptopropionic acid. Examples of xanthogen disulphides are dimethylxanthogen disulphide, diethylxanthogen disulphide and diisopropylxanthogen disulphide.

Examples of thiuram disulphides are tetramethylthiuram disulphide, tetraethylthiuram disulphide and tetrabutylthiuram disulphide. Examples of halogenated hydrocarbons are carbon tetrachloride, chloroform, methyl iodide, diiodomethane, difluorodiiodomethane, 1,4-diiodobutane, 1,6-diiodohexane, ethyl bromide, ethyl iodide, 1,2-dibromotetrafluoroethane, bromotrifluoroethene, bromodifluoroethene.

Examples of branched hydrocarbons are those from which an H radical can readily be eliminated. Examples thereof are toluene, ethylbenzene, cumene, pentaphenylethane, triphenylmethane, 2,4-diphenyl-4-methyl-1-pentene, dipentene, and terpenes, for example limonene, α-pinene, β-pinene, α-carotene and β-carotene.

Examples of linear or branched mercaptans are n-hexyl mercaptan or else mercaptans containing 9 to 16 carbon atoms and at least three tertiary carbon atoms, where the sulphur is bonded to one of these tertiary carbon atoms. These mercaptans can be used either individually or in mixtures. Suitable examples are the addition compounds of hydrogen sulphide onto oligomerized propene, especially tetrameric propene, or onto oligomerized isobutene, especially trimeric isobutene, which are frequently referred to in the literature as tertiary dodecyl mercaptan ("t-DDM").

Such alkyl thiols or (isomer) mixtures of alkyl thiols are either commercially available or else are preparable by the person skilled in the art by processes that have been sufficiently well described in the literature (see, for example, JP-A-07-316126, JP-A-07-316127 and JP-A-07-316128, and also GB-A-823,823 and GB-A-823,824).

The individual alkyl thiols or mixtures thereof are typically used in an amount of 0.05 phm to 3 phm, preferably of 0.1 phm to 1.5 phm, based on the total amount of diene monomer, further monomer and crosslinker.

The metered addition of the molecular weight regulator or the molecular weight regulator mixture is effected either at the start of the polymerization or else in portions in the course of the polymerization, preference being given to the addition of all or individual components of the regulator mixture in portions during the polymerization.

The emulsion polymerization is typically initiated using polymerization initiators which break down to free radicals (free-radical polymerization initiators). These include compounds containing an —O—O— unit (peroxo compounds) or an —N═N— unit (azo compound).

The peroxo compounds include hydrogen peroxide, peroxodisulphates, peroxodiphosphates, hydroperoxides, peracids, peresters, peracid anhydrides and peroxides having two organic radicals. Suitable salts of peroxodisulphuric acid and peroxodiphosphoric acid are the sodium, potassium and ammonium salts. Suitable hydroperoxides are, for example, tert-butyl hydroperoxide, cumene hydroperoxide and p-menthane hydroperoxide. Suitable peroxides having two organic radicals are dibenzoyl peroxide, 2,4-dichlorobenzoyl peroxide, di-tert-butyl peroxide, dicumyl peroxide, tert-butyl perbenzoate, tert-butyl peracetate etc. Suitable azo compounds are azobisisobutyronitrile, azobisvaleronitrile and azobiscyclohexanenitrile.

Hydrogen peroxide, hydroperoxides, peracids, peresters, peroxodisulphate and peroxodiphosphate are also used in combination with reducing agents. Suitable reducing agents are sulphenates, sulphinates, sulphoxylates, dithionite, sulphite, metabisulphite, disulphite, sugar, urea, thiourea, xanthogenates, thioxanthogenates, hydrazine salts, amines and amine derivatives such as aniline, dimethylaniline, monoethanolamine, diethanolamine or triethanolamine. Initiator systems consisting of an oxidizing agent and a reducing agent are referred to as redox systems. In the case of use of redox systems, salts of transition metal compounds such as iron, cobalt or nickel are frequently additionally used in combination with suitable complexing agents such as sodium ethylenediaminetetraacetate, sodium nitrilotriacetate and trisodium phosphate or tetrapotassium diphosphate.

Preferred redox systems are, for example: 1) potassium peroxodisulphate in combination with triethanolamine, 2) ammonium peroxodiphosphate in combination with sodium metabisulphite ($Na_2S_2O_5$), 3) p-menthane hydroperoxide/ sodium formaldehydesulphoxylate in combination with iron (II) sulphate ($FeSO_4*7\ H_2O$), sodium ethylenediaminoacetate and trisodium phosphate; 4) cumene hydroperoxide/ sodium formaldehydesulphoxylate in combination with iron (II) sulphate ($FeSO_4*7\ H_2O$), sodium ethylenediamineacetate and tetrapotassium diphosphate.

The amount of oxidizing agent is preferably 0.001 phm to 1 phm based on 100 phm, based on the total amount of diene monomer, further monomer and crosslinker. The molar amount of reducing agent is between 50% and 500% based on the molar amount of the oxidizing agent used.

The molar amount of complexing agent is based on the amount of transition metal used and is typically equimolar therewith.

To conduct the polymerization, all or individual components of the initiator system are metered in at the start of the polymerization or during the polymerization.

Addition of all and individual components of the activator system in portions during the polymerization is preferred. Sequential addition can be used to control the reaction rate.

The polymerization time is generally in the range from 5 h to 30 h.

The conversion in the emulsion polymerization is in the range from 85% to 100%, preferably 87% to 99.5% and more preferably 88% to 97%.

The aim in the polymerization is to obtain very high polymerization conversions, in order to crosslink the rubber. For this reason, it is optionally possible to dispense with the use of stoppers. If stoppers are used, suitable examples are dimethyl dithiocarbamate, sodium nitrite, mixtures of dimethyl dithiocarbamate and sodium nitrite, hydrazine and hydroxylamine and salts derived therefrom, such as hydrazine sulphate and hydroxylammonium sulphate, diethylhydroxylamine, diisopropylhydroxylamine, water-soluble salts of hydroquinone, sodium dithionite, phenyl-a-naphthylamine and aromatic phenols such as tert-butylcatechol, or phenothiazine.

The amount of water used in the emulsion polymerization is in the range from 70 to 300 phm, preferably in the range from 80 to 250 phm and more preferably in the range from 90 to 200 phm of water, based on the total amount of diene monomer, further monomer and crosslinker.

For reduction of the viscosity during the polymerization, for adjustment of the pH, and as a pH buffer, salts can be added to the aqueous phase in the course of the emulsion polymerization. Typical salts are salts of monovalent metals in the form of potassium hydroxide and sodium hydroxide, sodium sulphate, sodium carbonate, sodium hydrogencarbonate, sodium chloride and potassium chloride. Preference is given to sodium hydroxide or potassium hydroxide, sodium hydrogencarbonate and potassium chloride. The amounts of these electrolytes are in the range of 0 phm to 1 phm, preferably 0 to 0.5 phm, based on the total amount of diene monomer, further monomer and crosslinker.

To achieve homogeneous running of the polymerization, only a portion of the initiator system is used for the start of the polymerization and the rest is metered in during the polymerization. Typically, the polymerization is commenced with 10% by weight to 80% by weight, preferably 30% by weight to 50% by weight, of the total amount of initiator. It is also possible to subsequently meter in individual constituents of the initiator system.

The polymerization can be performed batchwise, semi-continuously or else continuously in a stirred tank cascade. In the case of the semi-batchwise process, water, monomers, initiators and emulsifiers are fed into the reactor over a particular period (for example over the entire polymerization time). There are various methods of adding reactants: For example, it is possible to meter the remainder of monomer (often together with initiator) into an initial charge composed of water, emulsifier and initiator and frequently also a particular amount of monomer during the polymerization. Another method is, for example, the initial charging of a portion of an emulsion containing all the reactants, and the metered addition of the rest of the emulsion during the polymerization, in which case the composition of the emulsion metered in may differ from the initial charge of emulsion for the commencement of the polymerization (A. E. Hamielec, H. Tobita, Polymerization Processes, 1. Fundamentals, Ullmann's Encyclopedia of Industrial Chemistry, 2011, page 88).

The advantages of such a semi-batchwise process are not just the better control of the polymerization and the removal of heat, because the rate of metered addition can be altered during the polymerization. The concentration of the unconverted monomers can be minimized by this method, such that the better control increases the reliability of the reaction. Moreover, productivity can be enhanced when the amount metered in is cooled beforehand, because less cooling is required during the polymerization.

When the period of metered addition of the monomers is increased in the semi-batchwise emulsion polymerization, the concentration of the monomers remains low during the polymerization, and the effect of this is that long-chain branches and crosslinking are promoted (A. E. Hamielec, H. Tobita, Polymerization Processes, 1. Fundamentals. Ullmann's Encyclopedia of Industrial Chemistry, 2011, page 85).

To remove unconverted monomers and volatile constituents, the short-stopped latex is subjected to a steam distillation. In this case, temperatures in the range from 70° C. to 150° C. are employed, the pressure being reduced in the case of temperatures of <100° C.

Before the volatile constituents are removed, the latex can be post-stabilized with emulsifier. For this purpose, the aforementioned emulsifiers are appropriately used in amounts of 0.1% by weight to 2.5% by weight, preferably 0.5% by weight to 2.0% by weight, based on 100 parts by weight of rubber.

Before or during the precipitation, one or more ageing stabilizers may be added to the latex. Suitable for this purpose are phenolic, aminic and also other ageing stabilizers.

Suitable phenolic ageing stabilizers are alkylated phenols, styrenated phenol, sterically hindered phenols such as 2,6-di-tert-butylphenol, 2,6-di-tert-butyl-p-cresol (BHT), 2,6-di-tert-butyl-4-ethylphenol, sterically hindered phenols containing ester groups, sterically hindered phenols containing thioether, 2,2'-methylenebis-(4-methyl-6-tert-butylphenol) (BPH), and also sterically hindered thiobisphenols.

If discolouration of the rubber is unimportant, aminic ageing stabilizers are also used, for example mixtures of diaryl-p-phenylenediamines (DTPD), octylated diphenylamine (ODPA), phenyl-α-naphthylamine (PAN), phenyl-β-naphthylamine (PBN), preferably those based on phenylenediamine. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis-1,4-(1,4-dimethylpentyl)-p-phenylenediamine (77PD), etc.

The other ageing stabilizers include phosphites such as tris(nonylphenyl) phosphite, polymerized 2,2,4-trimethyl-1,2-dihydroquinoline (TMQ), 2-mercaptobenzimidazole (MBI), methyl-2-mercaptobenzimidazole (MMBI), zinc methylmercaptobenzimidazole (ZMMBI). The phosphites are generally used in combination with phenolic ageing stabilizers.

The workup of the diene rubber gels thus produced can be effected by concentration, coagulation, co-coagulation with a further latex polymer or by freeze-coagulation (cf. U.S. Pat. No. 2,187,146) or by spray-drying. In the case of workup by spray-drying, it is also possible to add standard flow aids, for example calcium carbonate or silica. Preference is given to workup by acid coagulation, optionally in the presence of monovalent salts such as sodium chloride and/or potassium chloride. Suitable acids are especially mineral acids such as sulphuric acid or phosphoric acid.

The diene rubber gels used for production of the sealing compounds may be either unmodified diene rubber gels having essentially no reactive groups, particularly at the surface, or modified diene rubber gels modified with functional groups, particularly at the surface. The following reagents in particular are useful for surface modification of the diene rubber gels with low molecular weight agents: elemental sulphur, hydrogen sulphide and/or alkyl polymercaptans such as 1,2-dimercaptoethane or 1,6-dimercaptohexane, and additionally dialkyl- and dialkylaryldithiocarbamate such as the alkali metal salts of dimethyldithiocarbamate and/or dibenzyldithiocarbamate, and also alkyl- and arylxanthogenates such as potassium ethylxanthogenate and sodium isopropylxanthogenate, and the reaction with the alkali metal or alkaline earth metal salts of dibutyldithiophosphoric acid and dioctyldithiophosphoric acid, and also dodecyldithiophosphoric acid. Said reactions can advantageously also be conducted in the presence of sulphur, in which case the sulphur is also incorporated with formation of polysulphidic bonds. For addition of these bonds, it is possible to add free-radical initiators such as organic and inorganic peroxides and/or azo initiators.

Modification of the diene rubber gels, for example by ozonolysis and by halogenation with chlorine, bromine and iodine, is also an option. The amount of the modifying agent used is guided by the efficacy thereof and the demands made on the individual case and is in the range from 0.05% by weight to 30% by weight, based on the total amount of diene rubber gel used, more preferably 0.5% by weight to 10% by weight, based on the total amount of diene rubber gel.

The modification reactions can be conducted at temperatures of 0° C. to 180° C., preferably 5° C. to 95° C., optionally under pressure of 1 bar to 30 bar (1 bar=100 000 Pa). The modifications can be undertaken on diene rubber gels in substance or in the form of a dispersion thereof.

The preferred sealing gels used for production of sealing compounds are extended with at least one extender compound.

The amount of extender compound in the sealing gels of the invention is typically less than 60 phr, preferably 10 phr to 55 phr, more preferably 15 phr to 50 phr, based on the total amount of the sealing gel. Where phr is parts per one hundred parts of the total amount of the sealing gel and any additional rubber.

The extender compound used typically has a Tg of less than −20° C. and preferably less than −30° C.

Suitable extender compounds are any liquid elastomers, lubricant oils, or factices, which may be either aromatic or nonaromatic, and any liquid substances which are known for their plasticizing action in elastomers, especially in diene-containing elastomers. Particularly suitable are liquid elastomers having an Mn of 400 to 90 000 g/mol. Examples of lubricant oils are paraffinic oils, naphthenic oils having low or high viscosity, in hydrogenated or non-hydrogenated form, aromatic or DAE (Distilled Aromatic Extracts) oils, MES (Medium Extracted Solvates) oils, TDAE (Treated Distillate Aromatic Extracts) oils, mineral oils, vegetable oils (and oligomers thereof, for example palm oil, rapeseed oil, soya oil or sunflower oil) and mixtures of the oils mentioned.

Factices (or sulfurized oil) as used herein are vulcanized unsaturated oils such as vegetable oil. Crosslinking the fatty-acid chains of the oils with various kinds of crosslinking (e.g., including but not limited to Sulphur (brown factice), Peroxide, or $S_2Cl_2$ (white factice)) and per the use of different native oils—like rapeseed or castor oil—yields materials that improve the processing characteristics and ozone resistance of polymers. Factice, unlike gel polymers for example, are loosely knit three dimensional networks which do not have a morphology and are, therefore, distinguishable from gels. Factices can swell in oil and in this way hold an additional amount of oil inside a compound. Without being bound to any particular theory, during processing or in the event of pressure loss in tires—application of shear forces—part of the oil may be squeezed out of the compound improving its flow. After release of these forces, the oil is taken into the factice again. It has been found that in at least one embodiment of the invention in which the factice is used as extender compound, then the amount of natural or synthetic rubber (E) of a sealing compound containing the same may be reduced or replaced without loss in various performance aspects of the sealing compound.

Also suitable are oils based on polybutene, especially polyisobutylene (PIB)-based oils, and ether-, ester-, phosphate- and sulphonate-based plasticizers, preference being given to esters and phosphates. Preferred phosphate plasticizers are those having 12 to 30 carbon atoms, for example trioctyl phosphate. Preferred ester plasticizers are substances from the group comprising trimellitates, pyromellitates, phthalates, 1,2-cyclohexanedicarboxylates, adipates, azelates, sebacates, glycerol triesters and mixtures thereof. The fatty acids used with preference, in synthetic or natural form (in the case of sunflower oil or rapeseed oil, for example), are those containing more than 50% by weight and more preferably more than 80% by weight of oleic acid. Among the triesters, preference is given to glycerol triesters consisting predominantly to an extent of more than 50% by weight, more preferably more than 80% by weight, of unsaturated $C_{18}$ fatty acids, for example oleic acid, linoleic acid, linolenic acid and mixtures thereof. Such triesters have a high content of oleic acid and are described in the literature as plasticizers for rubber mixtures which are used in tyre treads, for example in US-A-2004/0127617.

Unlike in the case of liquid elastomers, the number-average molecular weight (Mn) of the liquid plasticizer is preferably in the range from 400 to 25 000 g/mol, even more preferably in the range from 800 to 10 000 g/mol (measured by means of GPC).

In summary, preference is given to extender compounds from the group of the liquid elastomers, polyolefin oils, naphthene oils, paraffin oils, DAE oils, MES oils, TDAE oils, mineral oils, vegetable oils, plasticizers composed of ethers, esters, phosphates, sulphonates, and factice, and mixtures of those described.

The extender compound can be incorporated into the sealing gel of the invention by a method where one or more of diene rubber gels (A) and (B) and/or gel (H1/H2) is recovered as gel and then the extender compound is incorporated within the recovered gel, for example where the extender compound is added to the gel in an emulsified form, and the mixture is mechanically kneaded or mixed and/or a method where a predetermined amount of the extender compound is incorporated in the polymerization solution of the one or more of diene rubber gels (A) and (B) and/or gel (H1/H2) and thereafter the gel (H1/H2) is recovered. The latter method is preferable because the extender compound is incorporated substantially uniformly by a simply method.

The diene rubber gels have an approximately spherical geometry. Primary particles refer, according to DIN 53206: 1992-08, to the diene rubber gel particles which are dispersed in the coherent phase and are recognizable as individual species by suitable physical methods (electron microscope) (cf., for example, Römpp Lexikon, Lacke and Druckfarben [Römpp's Lexicon, Coatings and Printing Inks], Georg Thieme Verlag, 1998). An "approximately spherical" geometry means that the dispersed primary particles of the diene rubber gels appear essentially as a circular surface when the composition is viewed, for example with an electron microscope. Since the diene rubber gels essentially do not change shape or morphology on further processing to give sealing compounds of the invention, the remarks made above and below also apply equally to the diene rubber gel-containing sealing compounds of the invention.

In the primary particles of the diene rubber gel present in the sealing compound of the invention, the deviation in the diameter of an individual primary particle, defined as $$[(d1-d2)/d2] \times 100,$$

in which d1 and d2 are any two diameters of the primary particle and d1>d2, is preferably less than 250%, more preferably less than 100%, even more preferably less than 80%, even more preferably less than 50%.

Preferably at least 80%, more preferably at least 90% and even more preferably at least 95% of the primary particles of the diene rubber gel have a deviation in the diameter, defined as $$[(d1-d2)/d2] \times 100,$$

in which d1 and d2 are any two diameters of the primary particle and d1>d2, of less than 250%, preferably less than 100%, even more preferably less than 80%, even more preferably less than 50%.

The aforementioned deviation in the diameters of the individual particles can be determined by the method which follows. First of all, a thin section of the solidified composition of the invention is produced. Then a transmission electron micrograph is taken at a magnification of, for example, 10 000-fold or 200 000-fold. In an area of 833.7 x 828.8 nm, the greatest and smallest diameter in 10 diene rubber gel primary particles are determined as d1 and d2. If the above-defined deviation of at least 80%, more preferably at least 90% and even more preferably at least 95% of the diene rubber gel primary particles analysed in each case is below 250%, preferably below 100%, even more preferably less than 80% and even more preferably below 50%, the diene rubber gel primary particles have the above-defined deviation feature.

If the concentration of the diene rubber gels in the sealing compound is so high that there is significant overlap of the visible diene rubber gel primary particles, the quality of evaluation can be improved by prior suitable dilution of the measurement sample.

In the sealing compound of the invention, the primary particles of the diene rubber gels (A) and (B) and of the gel (H1/H2) preferably have an average particle diameter of 5 nm to 500 nm, more preferably of 20 nm to 400 nm, more preferably of 20 nm to 300 nm, more preferably of 20 nm to 250 nm, even more preferably 20 nm to 99 nm, even more preferably 30 nm to 80 nm (diameter figures according to DIN 53206). The production of particularly finely divided diene rubber gels by emulsion polymerization is effected by controlling the reaction parameters in a manner known per se (see, for example, H. G. Elias, Macromolecules, Volume 2, Industrial Polymers and Syntheses, Wiley-VCH Verlag GmbH & Co. KGaA, Weinheim, 2007, page 160 ff.).

Since the morphology of the diene rubber gels (A) and (B) and of the gel (H1/H2) essentially does not change in the course of further processing of the composition of the invention, the average particle diameter of the dispersed primary particles in the further processing products obtained with the composition of the invention, such as diene rubber gel-containing sealing compounds, essentially corresponds to the average particle diameter of the dispersed primary particles.

The diene rubber gels (A) and (B) and the gel (H1/H2) have insoluble fractions in toluene at 23° C., called the gel content, of at least 60% by weight, more preferably about 80% by weight, even more preferably about 90% by weight.

The diene rubber gels (A) and (B) and the gel (H1/H2) appropriately have, in toluene at 23° C., a swelling index of less than about 80, preferably of less than 60, even more preferably of less than 40. For instance, the swelling indices (Qi) of the diene rubber gels and sealing gels may more preferably be from 5 to 35.

The diene rubber gels (A) and (B) and the gel (H1/H2) have a glass transition temperature (Tg) of −80° C. to −50° C., preferably of −75° C. to −60° C. and more preferably of −75° C. to −65° C.

In addition, the diene rubber gels (A) and (B) and the gel (H1/H2) preferably have a glass transition range (ΔTg) of less than 20° C., preferably less than 15° C., more preferably less than 10° C., especially preferably in the range from 5° C. to 10° C.

Polymerized diene rubber gels (A) and (B) and gel (H1/H2) may differ in terms of their microstructure from hot-polymerized diene rubber gels.

For example, in the case of 1,3-butadiene as diene monomer used, the difference in the microstructure relates to the relative proportions of 1,3-butadiene incorporated.

The relative proportions of 1,4-trans-, 1,2-vinyl- and 1,4-cis-butadiene units were determined on the basis of the measurement of the relative absorptions of 1,4-trans-, 1,2-vinyl- and 1,4-cis-butadiene bands in the IR spectrum of polymer films of the diene rubber gel. The method is calibrated with rubber samples having a microstructure known accurately from NMR studies. The figures in % by weight are based only on the incorporated butadiene units in the diene rubber gel and together add up to 100% by weight.

Polymerized diene rubber gels (A) and (B) and the gel (H1/H2) containing 1,3-butadiene as diene each have a proportion of cis-1,4-butadiene units of 8% by weight to 17% by weight, a proportion of trans-1,4-butadiene of 59% by weight to 75% by weight and a proportion of 1,2-vinylbutadiene of 17% by weight to 21% by weight, based on 1,3-butadiene incorporated.

In addition, the invention encompasses a sealing compound comprising
an extended sealing gel and
at least one resin (C).

In a preferred embodiment, the sealing compound comprises
an extended sealing gel,
at least one resin (C) and
at least one natural and/or synthetic rubber (E) which differs from the sealing gel.

In a further-preferred embodiment, the sealing compound comprises
an extended sealing gel,
at least one resin (C),
at least one ageing stabilizer (D) and
at least one natural and/or synthetic rubber (E) which differs from the sealing gel.

In the most preferred embodiment, the sealing compound comprises
an extended sealing gel,
at least one resin (C),
at least one ageing stabilizer (D),
at least one natural and/or synthetic rubber (E) which differs from the sealing gel and
at least one plasticizer (F).

The aforementioned sealing compounds may additionally comprise further constituents such as fillers and rubber auxiliaries.

The sealing compounds of the invention comprise the extended sealing gels of the invention, as described above.

The resin (C) used is appropriately one from the group of the hydrocarbon resins. Hydrocarbon resins are understood by those skilled in the art to mean polymers based on carbon and hydrogen which are used preferentially as tackifiers in polymer mixtures. They are miscible (compatible) with the polymer mixture in the amount used and act as diluents/extenders in the mixture. The hydrocarbons resins may be solid or liquid. The hydrocarbon resins may contain aliphatic, cycloaliphatic, aromatic and/or hydrogenated aromatic monomers. Different synthetic and/or natural resins may be used and may be oil-based (mineral oil resins). The Tg of the resins used should be above −30° C. The hydrocarbon resins may also be described as thermoplastic resins which soften and can thus be formed when heated. They may be characterized by the softening point or that temperature at which the resin sticks together, for example in the form of granules.

The resins used with preference have at least one and preferably all of the following properties:
Tg greater than −30° C.,
softening point greater than 5° C. (especially in the range from 5° C. to 135° C.),
the number-average molecular weight (Mn) is in the range from 400 g/mol to 2000 g/mol,
the polydispersity (PDI=Mw/Mn, with Mw=weight-average molecular weight) is less than 3.

The softening point is determined by the "Ring and Ball" method of standard ISO 4625. Mn and Mw can be determined by means of techniques familiar to those skilled in the art, for example gel permeation chromatography (GPC).

Examples of the hydrocarbon resins used are cyclopentadiene (CPD) or dicyclopentadiene (DCPD) homopolymer or cyclopentadiene copolymer resins, terpene homopolymer or copolymer resins, terpene/phenol homopolymer or copolymer resins, homopolymer or copolymer resins of the $C_5$ fraction or $C_9$ fraction, homo- or copolymer resins of α-methylstyrene and mixtures of those described. Particular mention should be made here of the copolymer resins consisting of (D)CPD/vinylaromatic copolymer resins, (D)CPD/terpene copolymer resins, (D)CPD/$C_5$ fraction copolymer resins, (D)CPD/$C_9$ fraction copolymer resins, terpene/vinylaromatic copolymer resins, terpene/phenol copolymer resins, C$_5$ fraction/vinylaromatic copolymer resins and mixtures of those described.

The term "terpene" encompasses monomers based on α-pinene, β-pinene and limonene, preference being given to limonene or a mixture of the limonene enantiomers. Suitable vinylaromatics are, for example, styrene, α-methylstyrene, o-methylstyrene, m-methylstyrene, p-methylstyrene, vinyltoluene, p-(tert-butyl)styrene, methoxystyrene, chlorostyrene, hydroxystyrene, vinylmesitylene, divinylbenzene, vinylnaphthalene or any vinylaromatic from the C$_9$ fraction or from the C$_8$ to C$_{10}$ fraction.

The amount of resin (C) in the sealing compound of the invention is typically 10 phr to 60 phr, preferably 20 phr to 50 phr, more preferably 25 phr to 45 phr, and in at least one embodiment less than 30 phr based on the total amount of sealing gel and further natural and/or synthetic rubber (E).

The ageing stabilizers (D) used may be the same substances as described above for the polymerization of the diene rubber gels (A), (B) and gel (H1/H2).

The amount of ageing stabilizer (D) in the sealing compound is typically 0.5 phr to 20 phr, preferably 1 phr to 10 phr, more preferably 1 phr to 5 phr, based on the total amount of sealing gel and further natural and/or synthetic rubber (E).

The natural and synthetic rubbers (E) differ from the diene rubber gels and sealing gels and generally have Mooney viscosities ML (1+4)@100° C. (DIN 53 523) of 10 MU to 80 MU, preferably 15 MU to 60 MU.

Preferred rubbers (E) are copolymers based on conjugated diolefins from a group comprising 1,3-butadiene, isoprene, 2,3-dimethyl-1,3-butadiene, 1,3-pentadiene, 1,3-hexadiene, 3-butyl-1,3-octadiene, 2-phenyl-1,3-butadiene or mixtures thereof, more preferably from a group comprising natural cis-1,4-polyisoprene, synthetic cis-1,4-polyisoprene, 3,4-polyisoprene, polybutadiene, 1,3-butadiene-acrylonitrile copolymer and mixtures thereof.

Further preferred synthetic rubbers are described, for example, in I. Franta, Elastomers and Rubber Compounding Materials, Elsevier, New York 1989, or else in Ullmann's Encyclopedia of Industrial Chemistry, Vol. A 23, VCH Verlagsgesellschaft, Weinheim 1993. They include
BR—polybutadiene,
Nd—BR—neodymium polybutadiene rubber,
Co—BR—cobalt polybutadiene rubber,
Li—BR—lithium polybutadiene rubber,
Ni—BR—nickel polybutadiene rubber,
Ti—BR—titanium polybutadiene rubber,
PIB—polyisobutylene,
ABR—butadiene/C$_{1-4}$-alkyl acrylate copolymers,
IR—polyisoprene,
SBR—styrene/butadiene copolymers having styrene contents of 1% by weight to
60% by weight, preferably 2% by weight to 50% by weight,
E-SBR—emulsion styrene/butadiene copolymers,
S-SBR—solution styrene/butadiene copolymers,
XSBR—styrene/butadiene copolymers and graft polymers with acrylic acid, methacrylic acid, acrylonitrile, hydroxyethyl acrylate and/or hydroxyethyl methacrylate, glycidyl methacrylate having styrene contents of 2% by weight to 50% by weight and contents of copolymerized polar monomers of 1% by weight to 30% by weight,
IIR—isobutylene/isoprene copolymers, preferably having isoprene contents of 0.5% by weight to 10% by weight,
BIIR—brominated isobutylene/isoprene copolymers, preferably having bromine content 0.1% by weight to 10% by weight,
CIIR—chlorinated isobutylene/isoprene copolymers, preferably having chlorine content 0.1% by weight to 10% by weight,
NBR—butadiene/acrylonitrile copolymers, typically having acrylonitrile contents of 5% by weight to 60% by weight, preferably 10% by weight to 50% by weight,
HNBR—fully and partly hydrogenated NBR rubber in which up to 100% of the double bonds are hydrogenated,
HXNBR—carboxylated partly and fully hydrogenated nitrile rubbers,
EP(D)M—ethylene/propylene/(diene) copolymers,
EVM—ethylene-vinyl acetate,
and mixtures of these rubbers.

The amount of natural and/or synthetic rubber (E) in sealing compounds of the invention is typically less than 55 phr, preferably 1 phr to 40 phr and more preferably 5 phr to 30 phr, based on the total amount of sealing gel and further natural and/or synthetic rubber (E).

The total amount of sealing gel and further natural and/or synthetic rubber (E) in the sealing compound is 100 phr.

For the sealing compound of the invention, the plasticizer (F) dilutes the matrix consisting of diene elastomers and resins and makes it softer and more supple, in order that the sealing effect of the sealing mixture under cold conditions in particular, typically at temperatures below 0° C., is improved. The plasticizer used typically has a Tg of less than −20° C. and preferably less than −40° C.

The extender compound added to the sealing gel may differ from the plasticizer (F) added to the sealing compound. The total amount of extender compound and plasticizers (F) in the sealing compounds of the invention is typically less than 60 phr, preferably 10 phr to 50 phr, more preferably 15 phr to 40 phr, based on the total amount of sealing gel and further natural and/or synthetic rubber (E).

Suitable plasticizers are any liquid elastomers or lubricant oils as described herein with respect to extender compounds The above-described sealing compounds of the invention may optionally contain additional fillers (G). A filler is understood in the present invention to mean both reinforcing fillers (typically particles having an average size of less than 500 nm, especially in the range from 20 nm to 200 nm) and non-reinforcing or inert fillers (typically particles having an average size of more than 1 μm, for example in the range from 2 μm to 200 μm). The reinforcing and non-reinforcing fillers are intended to improve cohesion in the sealing compound. These include:

carbon blacks which are used in the sealing compounds of the invention are appropriately those which are used in tyre production, for example carbon blacks according to ASTM Standard 300, 600, 700 or 900 (N326, N330, N347, N375, N683, N772 or N990), and typically produced by the thermal black, furnace black or gas black method and having BET surface areas of 20 m$^2$/g to 200 m$^2$/g (determined by means of absorption of CTAB as described in ISO 6810 Standard), for example SAF, ISAF, IISAF, HAF, FEF or GPF carbon blacks. Alternatively, it is also possible to use carbon blacks having a surface area of less than 20 m$^2$/g.

finely divided silicas, produced, for example, by precipitation of solutions of silicates or flame hydrolysis of silicon halides having specific surface areas of 5 to 1000 and preferably 30 m$^2$/g to 400 m$^2$/g (BET surface area measured by the ISO 5794/1 Standard) and having primary particle sizes of 5 to 400 nm. The silicas may optionally also be in the form of mixed oxides with other metal oxides, such as oxides of Al, Mg, Ca, Ba, Zn and Ti.

synthetic silicates, such as aluminium silicate, alkaline earth metal silicates such as magnesium silicate or calcium silicate, having BET surface areas (measured by the ISO 5794/1 Standard) of 20 m²/g to 400 m²/g and primary particle diameters of 10 nm to 400 nm.

natural silicates, such as kaolin and other naturally occurring silicas.

metal oxides, such as zinc oxide, calcium oxide, magnesium oxide, aluminium oxide.

metal carbonates, such as magnesium carbonate, calcium carbonate, zinc carbonate.

metal sulphates, such as calcium sulphate, barium sulphate.

metal hydroxides, such as aluminium hydroxide and magnesium hydroxide.

colouring fillers or coloured fillers, such as pigments.

rubber gels based on polychloroprene, NBR and/or polybutadiene having particle sizes of 5 nm to 1000 nm.

The fillers mentioned can be used alone or in a mixture.

The fillers are present in the sealing compounds of the invention typically in an amount of 1 phr to 50 phr, preferably in an amount of 1 phr to 30 phr, more preferably in an amount of 1 phr to 20 phr, based on the total amount of sealing gel and further natural and/or synthetic rubbers (E).

The sealing compounds of the invention may optionally contain further rubber auxiliaries which are typically used in rubber mixtures, for example one or more further crosslinkers, accelerators, thermal stabilizers, light stabilizers, ozone stabilizers, processing aids, extenders, organic acids or retardants.

The rubber auxiliaries can be used individually or in mixtures.

The rubber auxiliaries are used in standard amounts guided by the end use among other factors. Standard amounts are, for example, amounts of 0.1 phr to 50 phr.

In a preferred embodiment, the sealing compound of the invention comprises 45 phr to 100 phr, preferably 60 phr to 100 phr and more preferably 70 phr to 100 phr of the sealing gels of the invention having an extender compound incorporated therein, preference being given to styrene-butadiene-diene rubber gels, 10 phr to 60 phr, preferably 20 phr to 50 phr and more preferably 25 phr to 45 phr of at least one resin (C), 0.5 phr to 20 phr, preferably 1 phr to 10 phr and more preferably 1 phr to 5 phr of at least one ageing stabilizer (D), less than 55 phr, preferably 1 phr to 40 phr and more preferably 5 phr to 30 phr of at least one natural and/or synthetic rubber (E), 0 phr to 60 phr, preferably 10 phr to 50 phr and more preferably 15 phr to 40 phr of at least one plasticizer (F), optionally 1 phr to 50 phr, preferably 1 phr to 30 phr and more preferably 1 phr to 20 phr of at least one filler (G), based in each case on the total amount of sealing gel and further natural and/or synthetic rubbers (E).

In one embodiment where factice is the extender compound it has been surprisingly found that the amount of natural and/or synthetic rubber (E) which may be included in the sealing compound can be reduced or eliminated without decreasing the sealing compound adhesive and sealing performance.

In another embodiment the use of a sealing gel having i) in the form of a mixture comprising a diene rubber gel (A) obtainable by emulsion polymerization of at least one conjugated diene in the presence of at least one crosslinker (I) and a second diene rubber gel (B) obtainable by emulsion polymerization of at least one conjugated diene in the presence of at least one crosslinker (II), or ii) obtainable by emulsion polymerization of at least one conjugated diene in the presence of at least one crosslinker (I) and in the presence of at least one crosslinker (II) is preferred as having an improvement in failure temperature per the SAFT (see V3 and V7 discussed below).

The sealing compound of the invention preferably has at least one of the preferred properties described hereinafter.

The sealing compound of the invention typically has a Mooney viscosity (ML1+4@100° C.) of 5 MU up to 50 MU, preferably 8 MU up to 40 MU. The Mooney viscosity is determined by the standard ASTM D1646 (1999) and measures the torque of the sample at elevated temperature. It has been found to be useful to calender the sealing compound beforehand. For this purpose, the sealing compound is processed on a roller at a roller temperature of T≤60° C. to give a rolled sheet. The cylindrical sample punched out is placed into the heating chamber and heated up to the desired temperature. After a preheating time of one minute, the rotor rotates at a constant 2 revolutions/minute and the torque is measured after four minutes. The Mooney viscosity measured (ML 1+4) is in "Mooney units" (MU, with 100 MU=8.3 Nm).

In the SAFT test, the sealing compound of the invention typically has a failure temperature (Shear Adhesion Failure Temperature) of >75° C., preferably >85° C., more preferably >95° C.

For the sealing compounds of the invention, the distance that the steel ball covers in the rolling ball tack test is typically less than 3 cm, more preferably less than 2 cm, most preferably in the range from 0.05 cm to 2.0 cm.

The sealing compound should exert a minimum influence on the rolling resistance of the tyre. For this purpose, the loss factor tan δ at 60° C., which is established in industry as a rolling resistance indicator, is employed as the measurement parameter, this being determined by dynamic-mechanical analysis (DMA) with a rheometer. From the measurement, the temperature-dependent storage and loss moduli G' and G" are obtained. The temperature-dependent tan δ value is calculated from the quotient of loss modulus to storage modulus. The tan δ value at 60° C. and 10 Hz for the sealing compounds of the invention is typically less than 0.35, preferably less than 0.30 and more preferably less than 0.25.

The invention further relates to a process for producing sealing compounds. In this case, the sealing gel of the invention can also be produced by mixing latices of the diene rubber gels (A) and (B), or (A) and/or (B), with gel (H1/H2) and co-processing the mixture. Constituents of the sealing compound can likewise be produced by mixing the diene rubber gel/sealing gel latices with latices of the natural rubbers and/or synthetic rubbers and by mixing further sealing compound constituents, preferably in the form of suspensions thereof, and processing them together. For this purpose, the sealing compound of the invention can be produced in a masterbatch. The sealing compounds of the invention, composed of at least one sealing gel and at least one resin (C), can be produced in various ways. For example, it is possible to mix the solid or liquid individual components. Examples of equipment suitable for the purpose are rollers, internal mixers or mixing extruders. In a first step, the sealing gels are mixed with at least one resin (C) at a temperature (1st mixing temperature) which is above the softening temperature of the resin. It should be noted here that the temperature is not the target temperature for the mixer but the actual temperature of the mixture.

It is optionally possible to add various additives to the masterbatch, for example stabilizers, pigments, ageing stabilizers, etc. The masterbatch can be produced in a compounding system, for example in a paddle mixer, in an open two-roll mill, an extruder or any other mixing system capable of sufficient mixing and kneading of the various components of the sealing compound, such that a homogeneous mixture can be obtained. Preference is given to using a screw extruder with or without a constant screw helix, which can introduce high shear into the mixture.

The resin (C) may be solid or liquid in the initial phase prior to the addition to the sealing gels, which are solid. In the blending of the resin (C) with the sealing gel during the mixing, preference is given to a liquid form of the resin in order to obtain better mixing. This is achieved by the heating of the resin above the softening temperature. Depending on the resin used, the mixing temperature is typically above 70° C., preferably above 80° C., for example between 100° C. and 150° C. Preferably, the resin (C) is metered into the mixer under pressure in the form of an injection of the liquid resin with exclusion of oxygen. This step can be combined with the mixing at the 1st mixing temperature.

Further processing steps are preferably effected at a temperature below the softening temperature of the resin (C), for example at 50° C. (2nd mixing temperature).

One example for production of the sealing compound as a masterbatch in a screw extruder is as follows:

a single-screw extruder is used, having a 1st metered addition for the mixture constituents and a 2nd metered addition (metering pump) for the liquefied resin (C). The mixing is effected by rotating the screw, and the mixture components experience high shear. The mixture then passes to the homogenizer with a chopper tool. Downstream of this zone, the masterbatch is finally extruded in the desired shape through a simple extrusion head. The sealing mixture obtained is, for example, packed between two silicone-coated films and cooled down, and is ready to use. The extrudate can also be conducted beforehand to a twin-roller system in order to be able to meter in further mixture ingredients (pigments, fillers, etc.) if necessary in this step. The metered addition may be continuous. The roll temperature is preferably below 100° C. The sealing mixture is packed analogously. It is possible to produce this sealing mixture under industrial conditions without entering into the risk of contamination/soiling of the tools, for example as a result of sticking of the sealing compound to the roll.

The application of the sealing layer to the tyre may follow the vulcanization of the tyre. Typical methods of applying the sealing layer are described, for example, in U.S. Pat. No. 5,295,525. The sealing compounds based on diene rubber gels may be applied, for example, to the tyre lining in a continuous process without having to be subjected to a vulcanization. The sealing compound may be extruded, for example, as a sealing layer or strip on the inside of the tyre. In an alternative embodiment, the sealing compound may be processed as a strip which is then bonded to the inside of the tyre.

In a further alternative embodiment, the sealing compound can be prepared as a solvent cement which is sprayed, for example, onto the inside of the tyre. A further alternative mode of application as a laminate is described in U.S. Pat. No. 4,913,209.

The invention therefore further relates to the use of the sealing gels in sealing compounds, especially to improve the adhesion and cohesion properties.

The invention further relates to the use of sealing gel-containing sealing compounds as sealing layer in tyres, preferably on inner liners of pneumatic motor vehicle tyres.

The present invention thus further provides a pneumatic motor vehicle tyre comprising a sealing gel-containing sealing compound of the invention.

The invention also relates to the use of the sealing gels in sealing compounds for seals of hollow bodies and membranes.

The advantage of the invention lies especially in the excellent cohesion and adhesion properties and in the low rolling resistance of the sealing compound.

The examples which follow describe the invention but without limiting it.

EXAMPLES

In the examples which follow, the following substances are used:

| Name | Source |
|---|---|
| Styrene (ST) | Azelis |
| 1,3-Butadiene unstabilized (BDN) | Air Liquide Deutschland GmbH |
| Acrynitrile (ACN) | Merck KGaA |
| tert-Dodecyl mercaptan (tDDM) | Phillips |
| Dresinate 835 (Abieta ™ DRS 835) (emulsifier) | Arizona Chemical B.K. |
| Oleic acid | Merck KGaA |
| Trimethylolpropane trimethylacrylate (TMPTMA) | Sigma-Aldrich Chemie GmbH |
| Divinylbenzene (DVB) | Sigma-Aldrich Chemie GmbH |
| Potassium hydroxide (KOH) | Riedel-de-Haen |
| Potassium chloride (KCl) | Riedel-de-Haen |
| p-Menthane hydroperoxide (Trigonox ® NT 50) | Akzo-Degussa |
| Sodium phosphate dodecahydrate ($Na_3PO_4 * 12\ H_2O$) | Merck KGaA |
| Rongalit ® C (for synthesis) | Merck KGaA |
| Ethylenediaminetetraacetic acid EDTA (ultrapure) | Merck KGaA |
| Iron(II) sulphate heptahydrate ($FeSO_4 * 7\ H_2O$) | Merck KGaA |
| Sodium chloride (NaCl) | Merck KGaA |
| Phosphoric acid ($H_3PO_4$) | VWR |
| Calcium chloride anhydrous ($CaCl_2$) | Merck KGaA |
| E-SBR rubber (Buna SE 1502 H) | LANXESS Deutschland GmbH |
| Butyl rubber (X_Butyl ™ RB 301) | LANXESS Deutschland GmbH |
| Natural rubber (SVR 3L) | Weber & Schaer |
| Escorez ™ 2173 (hydrocarbon resin) | ExxonMobil Chemical |
| TDAE oil Vivatec ® 500 (extender compound) | LANXESS Deutschland GmbH |
| Rhenopren EPS (factice) | LANXESS Deutschland GmbH |
| Vulkanox ® HS LG (ageing stabilizer) | LANXESS Deutschland GmbH |
| Vulkanox ® 4020 (ageing stabilizer) | LANXESS Deutschland GmbH |
| Regal SRF (carbon black) | Cabot |
| Radglo ® GM-25 (pigment) | Radiant Color N.V. |
| Tronox ® Titanium Dioxide (pigment) | Tronox |
| Oppasin Blue 6900 (pigment) | BASF |

Test Methods:

Characterization of the Diene Rubber Gels and Sealing Gels

Determination of conversion: The conversion of the cold emulsion polymerization is calculated from the solids content of the latex solution. The determination of solids in the latex is effected by means of a halogen moisture analyser (Mettler Toledo, Halogen Moisture Analyzer HG63). For this purpose, an aluminium pan (Mettler, article no. 13865) is inserted into the sample holder and tared. Then an HAF1 glass fibre filter (Mettler, article no. 214464) is placed on top and the measurement is started. Typically, the glass fibre filter in the course of storage absorbs about 0.5% air humidity. Subsequently, the aluminium pan with the dried glass fibre filter is inserted into the sample holder and the balance is tared. About 1 g to 1.5 g of latex are weighed in and distributed over a maximum area in order to enable complete absorption of the liquid through the glass fibre filter. Then the measurement is started. When the weight loss of the sample is less than 1 mg per 50 seconds, the measurement is ended and the solids content is noted. The measured solids content of the latex and the theoretical solids content of the latex at the end of the polymerization are used to calculate the conversion of the emulsion polymerization.

Determination of gel content: The fraction insoluble in toluene is determined in toluene at 23° C. This is done by swelling 250 mg of the diene rubber gel in 20 ml of toluene with agitation at 23° C. for 24 hours. After centrifugation at 20 000 rpm, the insoluble fraction is removed and dried. The gel content is calculated from the quotient of the dried residue and the starting weight and is reported in percent.

Glass transition temperature: The glass transition temperatures (Tg) and the breadth of the glass transition ($\Delta$Tg) of the diene rubber gels are determined by differential thermoanalysis (DTA, differential scanning calorimetry (DSC)) on a 2003 Perkin Elmer DSC-7 calorimeter. For the determination of Tg and $\Delta$Tg, two cooling/heating cycles are conducted. Tg and $\Delta$Tg are determined in the second heating cycle. For the determinations, 10 mg to 12 mg of the diene rubber gels are used in a DSC sample holder (standard aluminium pan) from Perkin Elmer. The first DSC cycle is conducted by first cooling the sample down to −100° C. with liquid nitrogen and then heating it up to +150° C. at a rate of 20 K/min. The second DSC cycle is commenced by immediate cooling of the sample as soon as a sample temperature of +150° C. has been achieved. The cooling is effected at a rate of about 320 K/min. In the second heating cycle, the sample is heated up once more to +150° C. as in the first cycle. The heating rate in the second cycle is again 20 K/min. Tg and $\Delta$Tg are determined from the graph of the DSC curve of the second heating operation. For this purpose, three straight lines are applied to the DSC curve. The first straight line is applied to the part of the DSC curve below Tg, the second straight line to the curve section with a turning point that runs through Tg, and the third straight line to the curve section of the DSC curve above Tg. In this way, three straight lines with two points of intersection are obtained. Each point of intersection is characterized by a characteristic temperature. The glass transition temperature Tg is obtained as the mean of these two temperatures and the breadth of the glass transition $\Delta$Tg is obtained from the difference between the two temperatures.

To determine the swelling index, 250 mg of the diene rubber gel are swollen under agitation in 25 ml of toluene at 23° C. for 24 h. The gel is centrifuged off at 20 000 rpm, weighed and then dried to constant weight at 70° C. and weighed once again. The swelling index is calculated as follows:

$Qi$=wet weight of the gel/dry weight of the gel.

The Mooney viscosity of the diene rubber gels and the sealing gels is determined by the standard ASTM D1646 (1999) and measures the torque of the sample at elevated temperature using a 1999 Alpha Technologies MV 2000 Mooney viscometer (manufacturer serial number: 25AIH2753). It has been found to be useful to calender the diene rubber gel or the sealing gel beforehand. For this purpose, the diene rubber gel or the sealing gel is processed on a roller at a roller temperature of T≥60° C. to give a rolled sheet. The roller gap is varied between 1 mm and 3 mm, the friction is −10% and the roller revolutions per minute are 7-8 rpm. The measurement is conducted as follows: The cylindrical sample punched out is placed into the heating chamber and heated up to the desired temperature (here 100° C.). After a preheating time of one minute, the rotor (of size L) rotates at a constant 2 revolutions/minute and the torque is measured after four minutes. The Mooney viscosity measured (ML 1+4) is in "Mooney units" (MU, with 100 MU=8.3 Nm).

Characterization of the Sealing Compound

The tackiness (measurement parameter for adhesion) of the sealing compound of the invention is determined by means of a rolling ball tack tester.

The test is conducted on the basis of the standard ASTM D3121-06 at ambient temperature. The sealing compound is pressed to a thickness of 1 mm at 105° C. and 120 bar for 10 min and cooled to room temperature under pressure over a period of 12 h. The sealing compound thus pressed is cut to a rectangle of edge length 20 cm×10 cm, ensuring a smooth and contamination-free surface. The rectangular sealing compound of thickness 1 mm is placed onto a flat surface and the rolling ball tack tester is set up on the rectangular sealing film such that the tester is likewise flat (checked by means of a spirit level) and a ball rolling distance of ≥6 cm is possible. The polished steel ball having a diameter of 1 cm (ChemInstruments) is cleaned in acetone before each test and then placed onto the rolling ball tack tester. In this case, surface contamination of the ball, which can be caused, for example, by direct contact with the hands, should be avoided. By actuating the trigger mechanism of the rolling ball tack tester, the ball is put in a state of controlled movement. The distance that the ball has rolled on the test material is measured. This is done by measuring from the end of the rolling ball tester to the middle of the ball. Each experiment is conducted on a contamination-free surface. The experiment is repeated at least three times and the average is reported as the result.

To determine the failure temperature (measurement parameter for cohesion), the SAFT test (Shear Adhesion Failure Temperature) is conducted on the basis of standard ASTM D4498-07 (called Heat Fail Temperature therein). For this purpose, the sealing compound is pressed to a thickness of 1 mm at 105° C. and 120 bar for 10 min and cooled to room temperature under pressure over a period of 12 h. The pressed sealing compound which has been cut to an edge length of 2.5 cm×2.5 cm is positioned halfway between two polished stainless steel plates of dimensions 7.5 cm×7.5 cm×2.5 cm which have been cleaned beforehand with acetone, so as to give a square sample geometry of dimensions 2.5 cm×2.5 cm×0.1 cm between the two plates. The stainless steel plates from ChemInstruments each have a hole at the end of the plate. The sealing compound is pressed between the two stainless steel plates at room temperature at 5.4 bar with the stainless steel plates for 3 min, in order to establish an adhesive bond between stainless steel plate and sealing compound. Subsequently, the adhesive bond construction is suspended in a shear tester (ChemInstruments SS-HT-8). It should be ensured that the stainless steel plates along with the sealing compound hang vertically. A weight of 500 g is suspended on the hole in the plate pointing downward. The temperature of the shear testing oven (Memmert, UF 110 Plus) is left at room temperature for one hour. Subsequently, the time measurement is started and the temperature is increased to 40° C. in a linear manner within 10 min and kept constant for 20 min, before the oven is heated up to 175° C. at a heating rate of 0.5° C./min and kept constant for not more than 4 hours. The temperature and time at which the adhesive construction fails and the weight falls down are noted.

The determination of the loss factor tan δ at 60° C. as an indicator of rolling resistance is effected on the basis of standard DIN-ISO 6721-1 and 6721-2. The preparation of the sealing compound for the measurement of the loss factor as an indicator of rolling resistance is conducted as follows: The sealing compound is processed on a roller at a roller temperature of T≥60° C. to give a rolled sheet. The sheet is subsequently passed through a roll gap of 0.5 mm, which results in a sheet having a thickness of ≤3.5 mm. A sample of size 10 cm×10 cm is taken from this sheet and pressed in a mould of 10 cm×10 cm×0.1 cm at a pressure of 120 bar and a temperature T≥105° C. for 10 min. After cooling to room temperature within 10 minutes, a round sample having a diameter of 8 mm is punched out of the pressed material for dynamic-mechanical measurements. This sample is fixed between two plates. Before the temperature run, a time run is conducted on the sample for a period of 10 min at 100° C. and an initial force of 2 N. Subsequently, a temperature run is conducted with an initial force of 2 N and maximum deformation of 2% in the range from −100° C. to 170° C. at a constant frequency of 10 Hz and a heating rate of 3 K/min.

Production and Characterization of Extended Sealing Gels.

There following is a description of the production of diene rubber gels (A1 to A3 and B1 to B3) and extended diene rubber gels (XX1 to XX3)XX, and gel (H2) having extender compound incorporated therein (XX4). The diene rubber gels A1 to A3 and B1 to B3 and the extended diene rubber gels XX1, XX2 and XX5, and the extended sealing gel XX3,) XX4 and XX6 were used in the further examples as well. Also described is the production of SBR comparative examples W1.

The diene rubber gels and the sealing gel are produced by emulsion polymerization, using 1,3-butadiene (BDN), acrynitrile (ACN) and styrene (ST) as monomers and trimethylolpropane trimethacrylate (TMPTMA) and/or divinylbenzene (DVB) as crosslinkers. The monomers and essential formulation constituents used for the production of the diene rubber gels and the sealing gel are summarized in the following table:

TABLE 1

| Diene rubber gel | Solvent Water [g] | Emulsifiers | | Monomers | | | Crosslinker | |
|---|---|---|---|---|---|---|---|---|
| | | Oleic acid [g] | Dresinate [g] | BDN [g] | ST [g] | ACN [g] | TMPTMA [g] | DVB [g] |
| A1 | 11939 | 80 | 171 | 3492 | 400 | — | 112.5 | — |
| A2 | 11939 | 80 | 171 | 3892 | — | — | 112.5 | — |
| A3 | 11939 | 80 | 171 | 3492 | — | 400 | 112.5 | — |
| B1 | 11939 | 80 | 171 | 3528 | 400 | — | — | 90.0 |
| B2 | 11939 | 80 | 171 | 4193 | — | — | — | 134 |
| B3 | 11939 | 80 | 171 | 3528 | — | 400 | — | 90 |
| H2 | 11939 | 80 | 171 | 3904 | — | — | 62.5 | 45 |
| W1 | 11939 | 80 | 171 | 3528 | 400 | — | 75 | — |

(a) Emulsion Polymerization and Crosslinking of BR, SBR and NBR Rubber

Examples A1 to A3, B1 to B3 and H2

The figures relate to 100% pure feedstocks. The diene rubber gels are produced in a 20 l autoclave with stirrer system. Monomers, crosslinker, emulsifiers and the amounts of water specified in the table (minus the amounts of water required for the production of the aqueous premix and initiator solutions) were initially charged in the autoclave.

After adjusting the temperature of the reaction mixture to 10° C., freshly produced aqueous premix solution (4% strength) was introduced into the autoclave to activate the initiator. These premix solutions consisted of 1.10 g of ethylenediaminetetraacetic acid, 0.86 g of iron(II) sulphate*7H$_2$O (calculated without water of crystallization) and 2.07 g of Rongalit® C (sodium formaldehydesulphoxylate 2-hydrate, calculated without water of crystallization). At first, half the solution was added. Also metered into the reactor for initiation was 0.058% by weight (again based on the sum total of all the monomers) of p-menthane hydroperoxide (Trigonox® NT≥50 from Akzo-Degussa), which was emulsified in 200 ml of the emulsifier solution prepared in the reactor. On attainment of 30% conversion, the remaining 50% of the premix solution was metered in.

The temperature was controlled during the polymerization by adjusting the coolant volume and coolant temperature at 10±0.5° C.

On attainment of a polymerization conversion of more than 85% (typically: 90% to 100%), the polymerization was stopped by adding an aqueous solution of 2.35 g of diethylhydroxylamine. To remove volatile constituents from the latex, the latex was stripped with steam.

Comparative Examples W1

SBR rubber gels that are not in accordance with the invention were produced by means of hot emulsion polymerizations. The production of W1 was effected like the cold emulsion polymerization in each case, but at a polymerization temperature of 50° C.

(b) Workup of the Diene Rubber Gels and Sealing Gel

The precipitation of the diene rubber gel was conducted as follows:

A 15 l stainless steel pot equipped with a dissolver stirrer was initially charged with 3 kg of latex while stirring, and heated to 60° C. Then 1 kg of a 20% NaCl solution (333 g/kg of latex) was added, forming a very fine coagulate. Subsequently, the suspension was heated to 75° C. and 25% phosphoric acid was slowly added dropwise. In the course of this, it was important that the dissolver stirrer ran at maximum stirrer speed (1500 rpm), since the coagulate otherwise conglutinated readily to a large ball. In the neutral pH range, the suspension formed a foam, which disappeared completely in the acidic range. The precipitation was complete and the serum was colourless and clear.

Then the coagulate was filtered through a 200 μm cloth and then washed to neutrality with demineralized water. Two washing cycles were sufficient for the purpose.

Subsequently, the polymer was dried down to a residual moisture content of ≤0.5% in a vacuum drying cabinet at 55° C.

(c) Workup of the Extended Diene Rubber Gels and Sealing Gel XX1 to XX5

The precipitation of the diene rubber gel was conducted as follows:

A 15 l stainless steel pot equipped with a dissolver stirrer was initially charged with 3.3 kg of latex while stirring, and heated to 60° C. Then 1.1 kg of a 20% NaCl solution (333 g/kg of latex) was added, forming a very fine coagulate. Subsequently, TDAE oil was added, forming a brownish suspension. After heating to 75° C. 25% phosphoric acid was added dropwise. In the course of this, it was important that the dissolver stirrer ran at maximum stirrer speed (1500 rpm), since the coagulate otherwise conglutinated readily to a large ball. In the neutral pH range, the suspension formed a foam, which disappeared completely in the acidic range. The precipitation was complete and the serum was colourless and clear.

Then the coagulate was filtered through a 200 μm cloth and then washed to neutrality with demineralized water. Three washing cycles were sufficient for the purpose. Subsequently, the polymer was dried down to a residual moisture content of ≤0.5% in a vacuum drying cabinet at 55° C.

(d) Workup of the Extended Sealing Gel XX6

Dien rubber gel A and B and extender compound were mixed together homogeneously on a Collin W 150 G roll as described below.

The analytical data, determined by the methods described above, are reproduced in Table 2 below.

TABLE 2

| | Conversion [%] | Primary particle diameter [nm] | Gel content [%] | Swelling index QI | Tg [° C.] | ΔTg [° C.] | (ML1 + 4) @ 100° C. [MU] |
|---|---|---|---|---|---|---|---|
| A1 | 93 | 42 | 88 | 24 | −70 | 7 | 183 |
| A2 | 96 | 29 | 90 | 24 | −78 | 10 | 194 |
| A3 | 93 | 34 | 87 | 16 | −73 | 8 | 126 |
| B1 | 92 | 41 | 94 | 12 | −69 | 6 | 77 |
| B2 | 92 | 45 | 94 | 11 | −74 | 12 | 88 |
| B3 | 96 | 38 | 94 | 15 | −69 | 19 | 81 |
| H2 | 96 | 35 | 79 | 10 | −76 | 13.3 | 88 |
| W1 | 97 | 36 | 17 | 15 | −71 | 6 | 74 |

The cold-polymerized rubber gels (A) and (B) shown in Table 2, at a conversion of more than 85%, have a gel content of more than 75% and a Mooney viscosity (ML1+4@100° C.) of more than 75 MU.

The cold-polymerized BR gel (H) shown in Table 2, at a conversion of more than 85%, have a gel content of more than 70% and a Mooney viscosity (ML1+4@100° C.) of more than 80 MU.

Cold-polymerized SBR rubber gels of the invention differ from the hot-polymerized SBR rubber gels that are not in accordance with the invention in terms of microstructure. A comparison of the microstructure of the polymerized SBR rubber gels A1 and B1 of the invention with the corresponding hot-polymerized SBR rubber gels W1 which has been produced by a hot emulsion polymerization and are not in accordance with the invention is compiled in Table 3 below. Additionally, the microstructure of the cold-polymerized BR gels A2 and B2 of the invention is shown in Table 3. The measurements were conducted on a 1999 Thermo Scientific Nicolet FTIR Nexus instrument.

TABLE 3

| Diene rubber gel | cis [% by wt.] | trans [% by wt.] | vinyl [% by wt.] |
|---|---|---|---|
| A1 | 13.9 | 66.3 | 19.8 |
| W1 | 21.7 | 57.1 | 21.2 |
| B1 | 14.9 | 64.8 | 20.3 |
| H2 | 14.5 | 65.4 | 20.1 |
| A2 | 15 | 64 | 21 |
| B2 | 15 | 65 | 20 |

Polymerized diene rubber gels (A) and (B) of the invention have a proportion of cis-1,4-butadiene units of 8% by weight to 17% by weight, a proportion of trans-1,4-butadiene units of 59% by weight to 75% by weight and a proportion of 1,2-vinylbutadiene units of 17% by weight to 21% by weight, based on 1,3-butadiene incorporated.

Polymerized gel (H) of the invention have a proportion of cis-1,4-butadiene units of 8% by weight to 17% by weight, a proportion of trans-1,4-butadiene units of 59% by weight to 75% by weight and a proportion of 1,2-vinylbutadiene units of 17% by weight to 21% by weight, based on 1,3-butadiene incorporated.

TABLE 4

| | Diene rubber gel A1 [% by wt.] | Diene rubber gel B1 [% by wt.] | Diene rubber gel H2 [% by wt.] | Diene rubber gel A2 [% by wt.] | Extender compound (TDAE oil) [phr] | Extender compound (Rhenopren EPS) [% by wt.] | (ML1 + 4) @ 100° C. [MU] |
|---|---|---|---|---|---|---|---|
| XX1 | 100 | 0 | 0 | 0 | 50 | 0 | 74 |
| XX2 | 0 | 100 | 0 | 0 | 40 | 0 | 49 |
| XX3 | 30 | 70 | 0 | 0 | 47 | 0 | 63 |
| XX4 | 0 | 0 | 100 | 0 | 50 | 0 | 49 |
| XX5 | 0 | 0 | 0 | 100 | 55 | 0 | 57 |
| XX6 | 25.5 | 59.5 | 0 | 0 | 0 | 15 | 66 |

Diene rubber gels (A1), (A2) and (B1), and the gel (H2) are extended by the incorporation therein of TDAE oil as the extender compound in the workup process shown in Table 4 have a Mooney viscosity (ML1+4@100° C.) less than 80 MU. Diene rubber gels (A1) and (B1) extended with factice as the extender compound have a Mooney viscosity (ML1+4@100° C.) less than 80 MU shown in Table 4.

The sealing compound was produced on a Collin W 150 G roll mill built in April 2013. The roll temperature during the mixing operation was 90° C. The roller gap was varied between 1 mm and 3 mm, the friction was −10% and the roller revolutions per minute were 7 rpm to 8 rpm.

For the production of the sealing compounds V1 to V11 of the invention, the extended diene rubber gels XX were first each mixed together homogeneously on the roll as described above. Subsequently, rubber (E) was added in each case and well-dispersed. Thereafter, resin (C) was added gradually in small portions, followed by the ageing stabilizers (D), the pigment (G) and lastly, additionally the plasticizer (F). Rolling was continued until the mixture appeared homogeneous to the eye.

The composition of the sealing compounds VV1 to VV3 that are not in accordance with the invention and of the sealing compounds V1 to V11 of the invention and the amounts thereof are specified in Table 5 and 6. The amounts of the individual components are reported in phr.

TABLE 5

| Sealing compound | VV1 | VV2 | V1 | V2 | V3 | V4 | V5 | V6 | V7 |
|---|---|---|---|---|---|---|---|---|---|
| Diene rubber gel A1 [phr] | 25.5 | 0 | 0 | 25.5 | 0 | 0 | 0 | 0 | 0 |
| Diene rubber gel B1 [phr] | 59.5 | 40 | 59.5 | 0 | 0 | 0 | 0 | 0 | 0 |
| Diene rubber gel B2 [phr] | 0 | 0 | 0 | 0 | 0 | 0 | 0 | 0 | 0 |
| Diene rubber gel XX1 [phr] | 0 | 0 | 38.25 | 0 | 0 | 0 | 0 | 0 | 0 |

TABLE 5-continued

| Sealing compound | VV1 | VV2 | V1 | V2 | V3 | V4 | V5 | V6 | V7 |
|---|---|---|---|---|---|---|---|---|---|
| Diene rubber gel XX2 [phr] | 0 | 0 | 0 | 83.3 | 0 | 0 | 0 | 0 | 0 |
| Diene rubber gel XX3 [phr] | 0 | 0 | 0 | 0 | 125 | 117.6 | 125 | 0 | 0 |
| Diene rubber gel XX4 [phr] | 0 | 0 | 0 | 0 | 0 | 0 | 0 | 127.5 | 0 |
| Diene rubber gel XX5 [phr] | 0 | 0 | 0 | 0 | 0 | 0 | 0 | 0 | 131.75 |
| Diene rubber gel W1 [phr] | 0 | 40 | 0 | 0 | 0 | 0 | 0 | 0 | 0 |
| Resin (C) Escorez 2173 [phr] | 30 | 30 | 30 | 30 | 30 | 30 | 30 | 30 | 30 |
| Ageing stabilizer (D) Vulkanox HS LG [phr] | 1.5 | 1.5 | 3 | 3 | 3 | 3 | 3 | 3 | 3 |
| Ageing stabilizer (D) Vulkanox MB2/MG-C [phr] | 0 | 1.5 | 0 | 0 | 0 | 0 | 0 | 0 | 0 |
| Ageing stabilizer (D) Vulkanox 4020 [phr] | 1.5 | 0 | 3 | 3 | 3 | 3 | 3 | 3 | 3 |
| Rubber (E) Buna SE 1502H [phr] | 0 | 20 | 0 | 0 | 0 | 20 | 0 | 0 | 0 |
| Rubber (E) NR (SVR-3 L ML (1 + 4) @ 100° C. = 20 MU) [phr] | 15 | 0 | 15 | 15 | 15 | 0 | 0 | 15 | 15 |
| Rubber (E) X_Butyl™ RB 301 | 0 | 0 | 0 | 0 | 0 | 0 | 15 | 0 | 0 |
| Plasticizer (F) TDAE oil Vivatec 500 [phr] | 40 | 40 | 27.25 | 16.2 | 0 | 0 | 0 | 0 | 0 |
| Pigment (G) Radglo GM-25 [phr] | 0 | 1 | 0 | 0 | 0 | 1 | 0 | 0 | 0 |
| Pigment (G) Regal SRF [phr] | 3 | 0 | 3 | 3 | 3 | 0 | 3 | 3 | 3 |

TABLE 6

| | Sealing compound | | | | |
|---|---|---|---|---|---|
| | VV3 | V8 | V9 | V10 | V11 |
| Diene rubber gel A1 [phr] | 0 | 25.5 | 0 | 0 | 25.5 |
| Diene rubber gel B1 [phr] | 59.25 | 59.5 | 0 | 0 | 59.5 |
| Diene rubber gel A2 [phr] | 0 | 0 | 25.5 | | 0 |
| Diene rubber gel B2 [phr] | 0 | 0 | 59.5 | | 0 |
| Diene rubber gel A3 [phr] | 0 | 0 | 0 | 25.5 | |
| Diene rubber gel B3 [phr] | 0 | 0 | 0 | 59.5 | |
| Resin (C) Escorez 2173 [phr] | 30 | 30 | 30 | 30 | 30 |
| Ageing stabilizer (D) Vulkanox HS LG [phr] | 3 | 3 | 3 | 3 | 3 |
| Ageing stabilizer (D) Vulkanox 4020 [phr] | 3 | 3 | 3 | 3 | 3 |
| Rubber (E) Buna SE 1502H [phr] | 15 | 0 | 0 | 0 | 7.5 |
| Factice (F) Rhenopren EPS [phr] | 25.5 | 15 | 15 | 15 | 7.5 |
| Plasticizer (F) TDAE oil Vivatec 500 [phr] | 40 | 40 | 50 | 40 | 40 |
| Pigment (G) Oppasin Blue [phr] | 1 | 1 | 1 | 1 | 1 |
| Pigment (G) Tronox [phr] | 1 | 1 | 1 | 1 | 1 |

The characterization of the sealing compounds VV1 to VV3 and V1 to V11 is compiled in Table 7 and 8 below.

TABLE 7

| Sealing compound | VV1 | VV2 | VV3 | V1 | V2 | V3 |
|---|---|---|---|---|---|---|
| (ML1 + 4) @ 100° C. [MU] | 12 | 10 | 10 | 11 | 11 | 12 |
| Rolling ball tack tester [cm] | 1.0 | 1.3 | 0.9 | 0 | 0 | 0 |
| tan δ @ 60° C. | 0.28 | 0.3 | 0.24 | 0.24 | 0.25 | 0.20 |

| Sealing compound | V4 | V5 | V6 | V7 |
|---|---|---|---|---|
| (ML1 + 4) @ 100° C. [MU] | 11 | 14 | 13 | 12 |
| Rolling ball tack tester [cm] | 0.8 | 2.4 | 1.5 | 1.7 |
| tan δ @ 60° C. | 0.24 | 0.23 | 0.22 | 0.20 |

TABLE 8

| Sealing compound | V8 | V9 | V10 | V11 |
|---|---|---|---|---|
| (ML1 + 4) @ 100° C. [MU] | 11 | 12 | 10 | 12 |
| Rolling ball tack tester [cm] | 1.0 | 0 | 1.1 | 0.7 |
| tan δ @ 60° C. | 0.16 | 0.14 | 0.19 | 0.22 |

The Mooney viscosity is determined by the methods described above on an Alpha Technologies MV 2000 Mooney viscometer.

Tackiness is determined by the methods described above on a rolling ball tack tester (RBT-100) from ChemInstruments.

The tan δ value is determined by the methods described above by means of an ARES-G2 rheometer from TA Instruments.

The determination of the failure temperature of the particular sealing compound by means of the SAFT test was effected in a double determination on two specimens of the particular sealing compound. The measurements were conducted by the methods described above on a ChemInstruments HT-8 shear tester in a Memmert UF 110 Plus heating cabinet. The mean values for the results are compiled in Table 9 and 10 below.

TABLE 9

| | VV1 | VV2 | VV3 | V1 | V2 | V3 |
|---|---|---|---|---|---|---|
| Failure temperature [° C.] | 72 | 51 | 40 | 89 | 120 | 142 |

| | V4 | V5 | V6 | V7 |
|---|---|---|---|---|
| Failure temperature [° C.] | 98 | >175 | 76 | 116 |

TABLE 10

| | V8 | V9 | V10 | V11 |
|---|---|---|---|---|
| Failure temperature [° C.] | 92 | 108 | 92 | 92 |

A sealing compound which is ready to use in practice has to pass both the rolling ball tack test and the SAFT test. In this case, the rolling ball tack test is considered to have been passed when the distance that the ball rolls is less than 3 cm.

The SAFT test is considered to have been passed when the failure temperature is greater than 75° C. An overall assessment of the sealing compounds \N1 to VV3 and V1 to V11 is compiled in Table 11 and 12 below.

TABLE 11

| Sealing compound | VV1 | VV2 | VV3 | V1 | V2 | V3 | V4 | V5 | V6 | V7 |
|---|---|---|---|---|---|---|---|---|---|---|
| Rolling ball tack test assessment | P | P | P | P | P | P | P | P | P | P |
| SAFT test assessment | F | F | F | P | P | P | P | P | | P |
| Overall assessment | F | F | F | P | P | P | P | P | | P |

P means "passed" and F means "failed".

TABLE 12

| Sealing compound | V8 | V9 | V10 | V11 |
|---|---|---|---|---|
| Rolling ball tackiest assessment | P | P | P | P |
| SAFT test assessment | P | P | P | P |
| Overall assessment | P | P | P | P |

P means "passed" and F means "failed".

The sealing compounds that are not in accordance with the invention fail at least one of the two tests.

The sealing compounds of the invention V1 to V11 are notable in that they pass both tests. Further, they show increased failure temperature in the SAFT test resulting in an improved sealing performance.

If the sealing compound of the invention is applied to the tyre liner as a film of thickness 3 mm and the tyre is filled with air such that it has an air pressure of 2.5 bar, the sealing compound has a self-sealing effect when a nail which has been hammered in (to diameter 5 mm) is pulled out. The air pressure in the tyre remains constant for at least one week.

The invention claimed is:

1. A sealing gel for self-sealing tyres
   i) in the form of a mixture comprising a diene rubber gel (A) formed by emulsion polymerization of at least one conjugated diene in the presence of at least one crosslinker (I) and a second diene rubber gel (B) formed by emulsion polymerization of at least one conjugated diene in the presence of at least one crosslinker (II), or
   ii) formed by emulsion polymerization of at least one conjugated diene in the presence of at least one crosslinker (I) and/or in the presence of at least one crosslinker (II), wherein:
   the at least one crosslinker (I) are selected from: acrylates and methacrylates of polyhydric $C_2$-$C_{20}$ alcohols, and
   the at least one crosslinker (II) are selected from: compounds having two or more vinyl, allyl or isopropenyl groups or maleimide unit, wherein
   the sealing gel further comprises an extender compound incorporated therein, and wherein said extender compound is a liquid elastomer, a lubricant oil, a factice and/or mixtures thereof, and wherein
   said sealing gel has a Mooney viscosity (ML1 +4) @100° C. of 30 to 90 MU, determined by the standard ASTM D1645(1999), and wherein the at least one conjugated diene is selected from: 1,3-butadiene, and wherein the sealing gel has a proportion of cis-1,4-butadiene units of 8% to 17% by weight, a proportion of trans-1,4-butadiene units of 59 to 75 % by weight and a proportion of 1,2-vinylbutadiene units of 17% to 21% by weight, wherein all weight percentages are based on incorporated 1,3-butadiene.

2. The sealing gel according to claim 1, wherein: said sealing gel has a Mooney viscosity (ML1+4) @ 100° C. 40 to 85 MU, determined by the standard ASTM D1646(1999).

3. The sealing gel according to claim 1, wherein the diene rubber gel (A) has a Mooney viscosity (ML1+4) @ 100° C. of 170 MU to 195 MU and the diene rubber gel (B) has a Mooney viscosity (ML1+4) @ 100° C. of 75 MU to 110 MU, wherein the Mooney viscosity is determined by the standard ASTM D1646(1999).

4. The sealing gel according to claim 1, wherein further monomers are polymerized in the emulsion polymerization of the at least one conjugated diene, wherein said further monomers are selected from: 1,3-butadiene, vinylaromatics, styrene, 2-methylstyrene, 3-methyl styrene, 4-methyl styrene, α-methylstyrene, 2,4-dimethyl styrene, 2,4-diisopropylstyrene, 4-tert-butyl styrene or tert-butoxystyrene, acrylonitrile, isoprene, esters of acrylic acid and methacrylic acid, tetrafluoroethylene, vinylidene fluoride, hexafluoropropene, 2-chlorobutadiene, 2,3-dichlorobutadiene, carboxylic acids containing double bonds, acrylic acid, methacrylic acid, maleic acid ,itaconic acid, hydroxyl compounds containing double bonds, hydroxyethyl methacrylate, hydroxyethyl acrylate or hydroxybutyl methacrylate, amine-functionalized (meth)acrylates, glycidyl methacrylate, acrolein, N-vinyl-2-pyrrolidone, N-allylurea, N-allylthiourea, secondary amino (meth)acrylates, 2-tert-butylaminoethyl methacrylate, 2-tert -butylaminoethylmethacrylamide, and/or vinylic heteroaromatics.

5. The sealing gel according to claim 4, wherein the further monomer is styrene and wherein said emulsion polymerization is occured at 5° C. to 20° C.

6. The sealing gel of claim 1, wherein:
   the at least one crosslinker (I) is selected from the group consisting of:
   acrylates and methacrylates of ethylene glycol, propane-1,2-diol, butane-1,4-diol, hexanediol, polyethylene glycol having 2 to 8 oxyethylene units, neopentyl glycol, bisphenol A, glycerol, trimethylolpropane, pentaerythritol, sorbitol with unsaturated polyesters of aliphatic di- and polyols and mixtures thereof.

7. The sealing gel of claim 6, wherein:
   the at least one crosslinker (I) is selected from the group consisting of:
   acrylates and methacrylates of propane-1,2-diol, butane-1,4-diol, neopentyl glycol, bisphenol A, glycerol, trimethylolpropane and pentaerythritol.

8. The sealing gel of claim 1, wherein:
   the at least one crosslinker (I) is trimethylolpropane trimethacrylate (TMPTMA).

9. The sealing gel of claim 1, wherein
   the at least one crosslinker (II) is selected from the group consisting of:
   diisopropenylbenzene, divinylbenzene (DVB), divinyl ether, divinyl sulphone, diallyl phthalate, trivinylbenzene, triallyl cyanurate, triallyl isocyanurate, 1,2-polybutadiene, N,N'-m-phenylenemaleimide, tolylene-2,4-bis(maleimide) and triallyl trimellitate and mixtures thereof.

10. The sealing gel according to claim 1, wherein: the extender compound is at least one of a paraffinic oil, a hydrogenated or non-hydrogenated naphthenic oil, an aromatic or DAE (Distilled Aromatic Extracts) oil, a MES (Medium Extracted Solvates) oil, a Treated Distillate Aromatic Extracts (TDAE) oil, a mineral oil, a vegetable oil and/or oligomers and mixtures of said oils.

11. The sealing gel according to claim 1 wherein: the extender compound is a lubricant oil based on polybutene.

12. A sealing gel for self-sealing tyres
   i) in the form of a mixture comprising a diene rubber gel (A) formed by emulsion polymerization of at least one conjugated diene in the presence of at least one crosslinker (I) and a second diene rubber gel (B) formed by emulsion polymerization of at least one conjugated diene in the presence of at least one crosslinker (II), or
   ii) formed by emulsion polymerization of at least one conjugated diene in the presence of at least one crosslinker (I) and in the presence of at least one crosslinker (II), where
   crosslinkers (I) are acrylates and methacrylates of polyhydric $C_2$-$C_{20}$ alcohols; and
   crosslinkers (II) are compounds having two or more vinyl, allyl or isopropenyl groups or one maleimide unit,
   wherein the sealing gel further comprises an extender compound incorporated therein, and wherein
   said extender compound is a liquid elastomer, a lubricant oil, a factice and/or mixtures thereof wherein
   said sealing gel has a Mooney viscosity (ML1+4) @100° C. of 30 to 90 MU, determined by the standard ASTM D1646(1999), and wherein the at least one conjugated diene is selected from: 1,3-butadiene, and wherein the sealing gel has a proportion of cis-1,4-butadiene units of 8% to 17% by weight, a proportion of trans-1,4-butadiene units of 59% to 75% by weight and a proportion of 1,2-vinylbutadiene units of 17% to 21% by weight, wherein all weight percentages are based on incorporated 1,3-butadiene.

13. The sealing gel of claim 12, wherein:
the crosslinker (I) is selected from the group consisting of:
acrylates and methacrylates of ethylene glycol, propane-1,2-diol, butane -1,4-diol, hexanediol polyethylene glycol having 2 to 8 oxyethylene units, neopentyl glycol, bisphenol A, glycerol, trimethylolpropane, pentaerythritol, sorbitol with unsaturated polyesters of aliphatic di- and polyols, and mixtures thereof.

14. The sealing gel of claim 12, wherein:
the crosslinker (I) is trimethylolpropane trimethacrylate (TMPTMA).

15. The sealing gel of claim 12, wherein:
the crosslinker (II) is a compound selected from the group consisting of:
diisopropenylbenzene, divinylbenzene (DVB), divinyl ether, divinyl sulphone, diallyl phthalate, trivinylbenzene, triallyl cyanurate, triallyl isocyanurate, 1,2-polybutadiene, N,N'-m-phenylenemaleimide, tolylene-2,4-bis(maleimide) and triallyl trimellitate and mixtures thereof.

16. The sealing gel according to claim 12, wherein the extender compound is factice.

17. Sealing compounds exhibiting improved adhesion and cohesion properties comprising a sealing gel according to claim 1.

18. Sealing compounds comprising:
at least one sealing gel according to claim 1, in an amount of 45 phr to 100 phr,
resin (C) in an amount of 10 phr to 60 phr, and
a natural rubber or synthetic rubber (E), which is based on conjugated diolefins selected from the group consisting of 1,3-butadiene, isoprene, 2,3-dimethyl-1,3-butadiene, 1,3-pentadiene, 1,3-hexadiene, 3-butyl-1,3-octadiene, 2-phenyl-1,3-butadiene or mixtures thereof, in an amount of less than 55 phr,
based in each case on the the total amount of sealing gel and natural and/or synthetic rubber (E) in the sealing compound.

19. A process for producing sealing compounds of claim 18, comprising the steps of
mixing the sealing gel, the natural or synthetic rubber (E) and the resin (C), wherein the sealing gel and the natural or synthetic rubber (E) are mixed in the form of their latices.

20. A sealing layer in tyres, sealing layers on inner liners in pneumatic motor vehicle tyres, hollow bodies or membranes, comprising a sealing compound according to claim 18.

21. Pneumatic motor vehicle tyres having a sealing compound according to claim 18.

* * * * *